(12) United States Patent
Shchokin et al.

(10) Patent No.: US 9,776,483 B2
(45) Date of Patent: Oct. 3, 2017

(54) ELECTROMECHANICAL STRUT WITH MOTOR-GEARBOX ASSEMBLY HAVING DUAL STAGE PLANETARY GEARBOX

(71) Applicant: Magna Closures Inc., Newmarket (CA)

(72) Inventors: Borys M. Shchokin, Thornhill (CA); Dan Cosmin, Richmond Hill (CA); Joseph Scheuring, Richmond Hill (CA)

(73) Assignee: MAGNA CLOSURES INC., Newmarket (CA)

( * ) Notice: Subject to any disclaimer, the term of this patent is extended or adjusted under 35 U.S.C. 154(b) by 0 days.

(21) Appl. No.: 14/938,156

(22) Filed: Nov. 11, 2015

(65) Prior Publication Data

US 2016/0144694 A1    May 26, 2016

Related U.S. Application Data

(60) Provisional application No. 62/109,157, filed on Jan. 29, 2015, provisional application No. 62/083,419, filed on Nov. 24, 2014.

(51) Int. Cl.
*B60J 5/10* (2006.01)
*F16H 1/28* (2006.01)
(Continued)

(52) U.S. Cl.
CPC ............... *B60J 5/107* (2013.01); *F16H 1/28* (2013.01); *F16H 25/20* (2013.01); *F16H 57/082* (2013.01); *E05F 15/622* (2015.01); *E05Y 2201/72* (2013.01); *E05Y 2900/546* (2013.01); *E05Y 2900/548* (2013.01); *F16H 2025/2087* (2013.01)

(58) Field of Classification Search
CPC . B60J 5/107; B60J 5/101; F16H 25/20; F16H 1/28; F16H 57/082; F16H 2025/2087; F16H 2001/2872; E05Y 2201/72; E05Y 2900/546; E05Y 2900/548; E05F 15/622
See application file for complete search history.

(56) References Cited

U.S. PATENT DOCUMENTS 6,516,567 B1    2/2003    Stone et al.
8,523,730 B2    9/2013    Miyawaki et al.
(Continued)

FOREIGN PATENT DOCUMENTS

EP    2189684 B1    1/2013

*Primary Examiner* — Glenn Dayoan
*Assistant Examiner* — Melissa A Black
(74) *Attorney, Agent, or Firm* — Dickinson Wright PLLC

(57) ABSTRACT

An electromechanical strut is provided for moving a pivotal closure member between an open position and a closed position relative to a motor vehicle body. The electromechanical strut includes a drive mechanism having a motor-gearbox assembly that is operable to drive a rotatable power screw. The drive mechanism converts rotary motion of the power screw into linear motion of an extensible member to move the extensible member between a retracted position corresponding to the closed position of the closure member and an extended position corresponding to the open position of the closure member. The motor-gearbox assembly includes a gearbox unit equipped with a dual-stage planetary geartrain that is operably disposed between a motor output and the power screw. The dual-stage planetary geartrain includes a first stage gearset and a second stage gearset sharing a common ring gear.

22 Claims, 32 Drawing Sheets

(51) Int. Cl.
*F16H 25/20* (2006.01)
*F16H 57/08* (2006.01)
*E05F 15/622* (2015.01)

(56) References Cited

U.S. PATENT DOCUMENTS

| | | |
|---|---|---|
| 2004/0084265 A1 | 5/2004 | Muller et al. |
| 2008/0250720 A1 | 10/2008 | Oxley et al. |
| 2012/0000304 A1 | 1/2012 | Hamminga et al. |
| 2013/0269305 A1* | 10/2013 | Wang .................... A01D 34/00 56/14.7 |
| 2014/0106926 A1 | 4/2014 | Hagedorn |

* cited by examiner

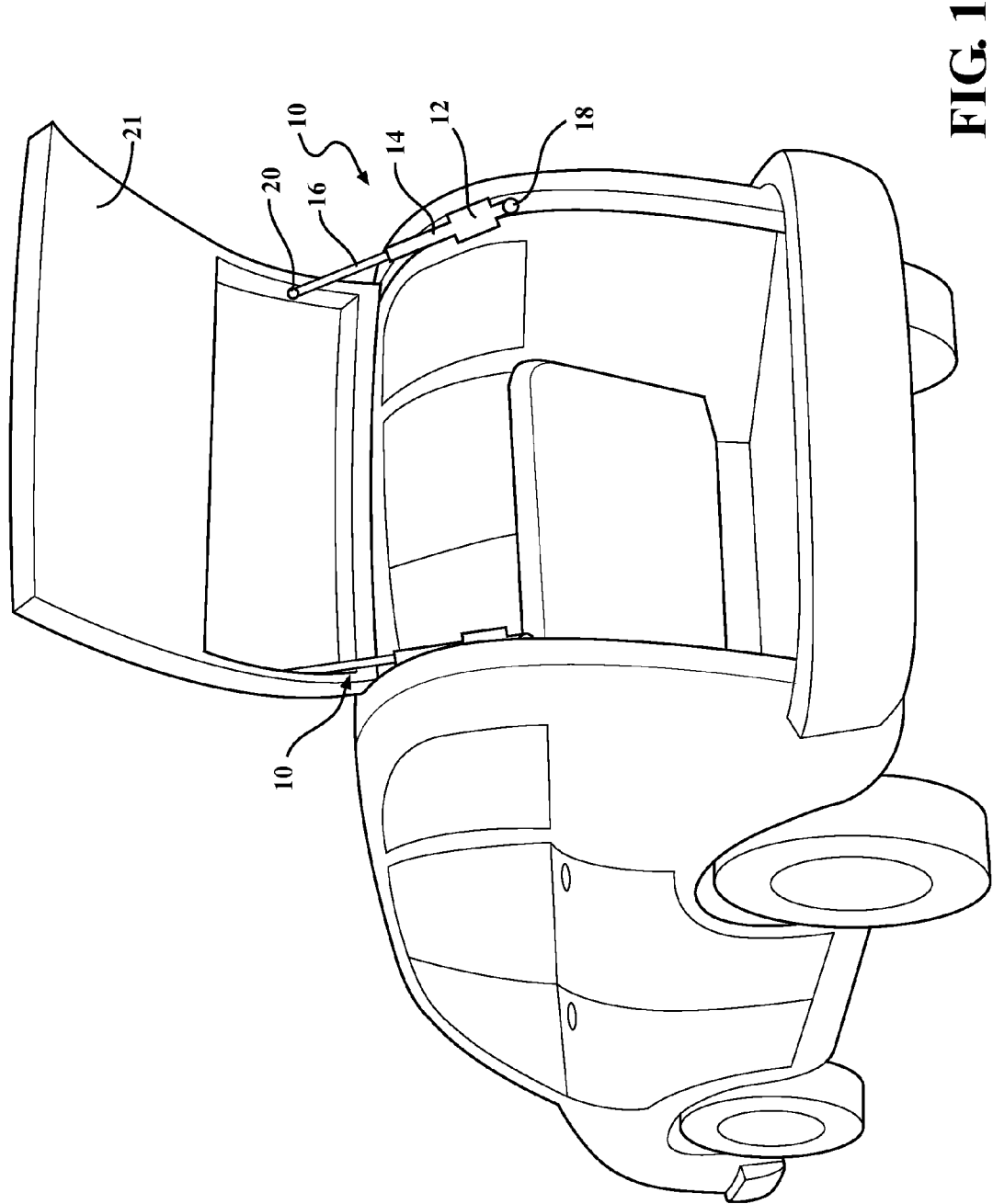

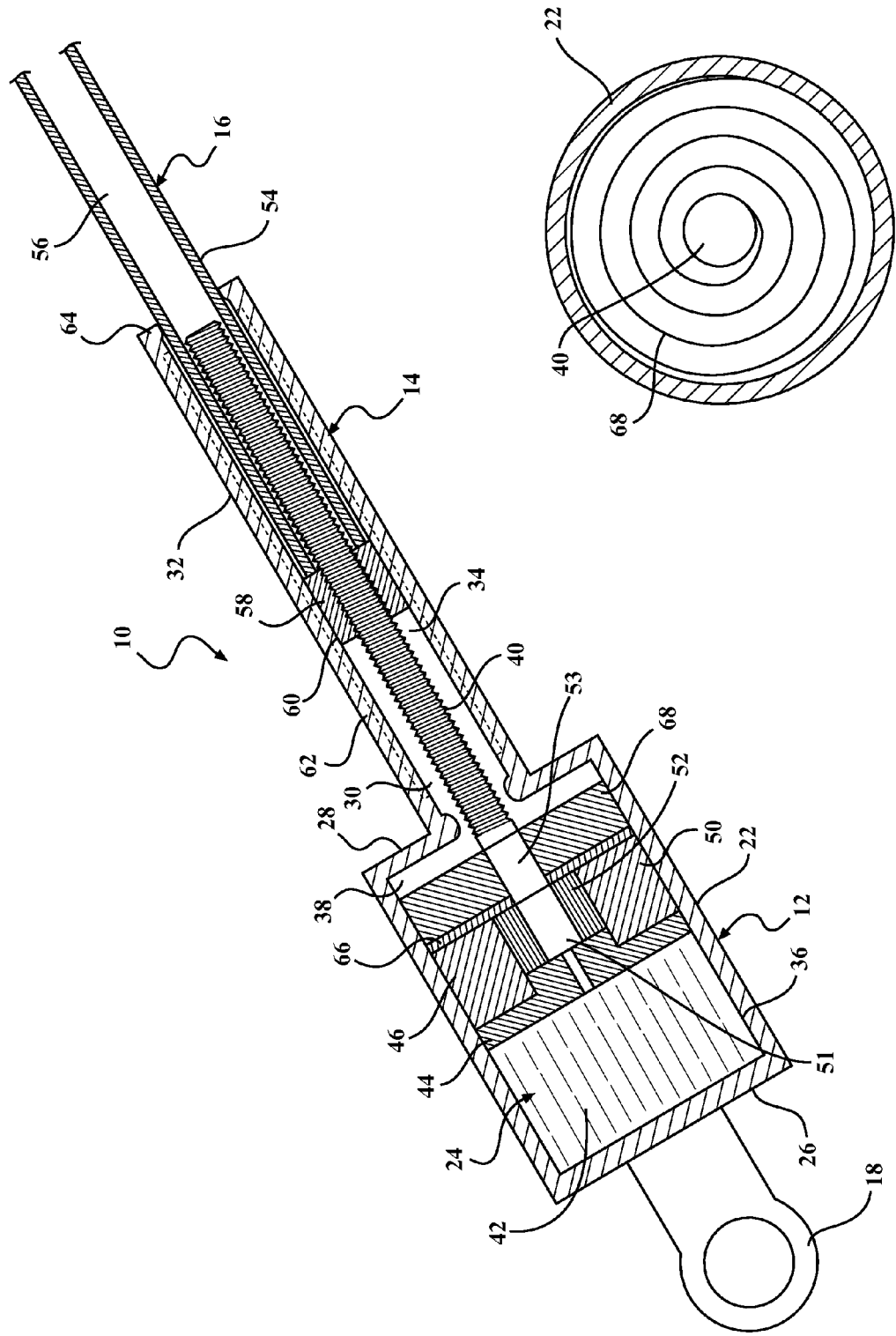

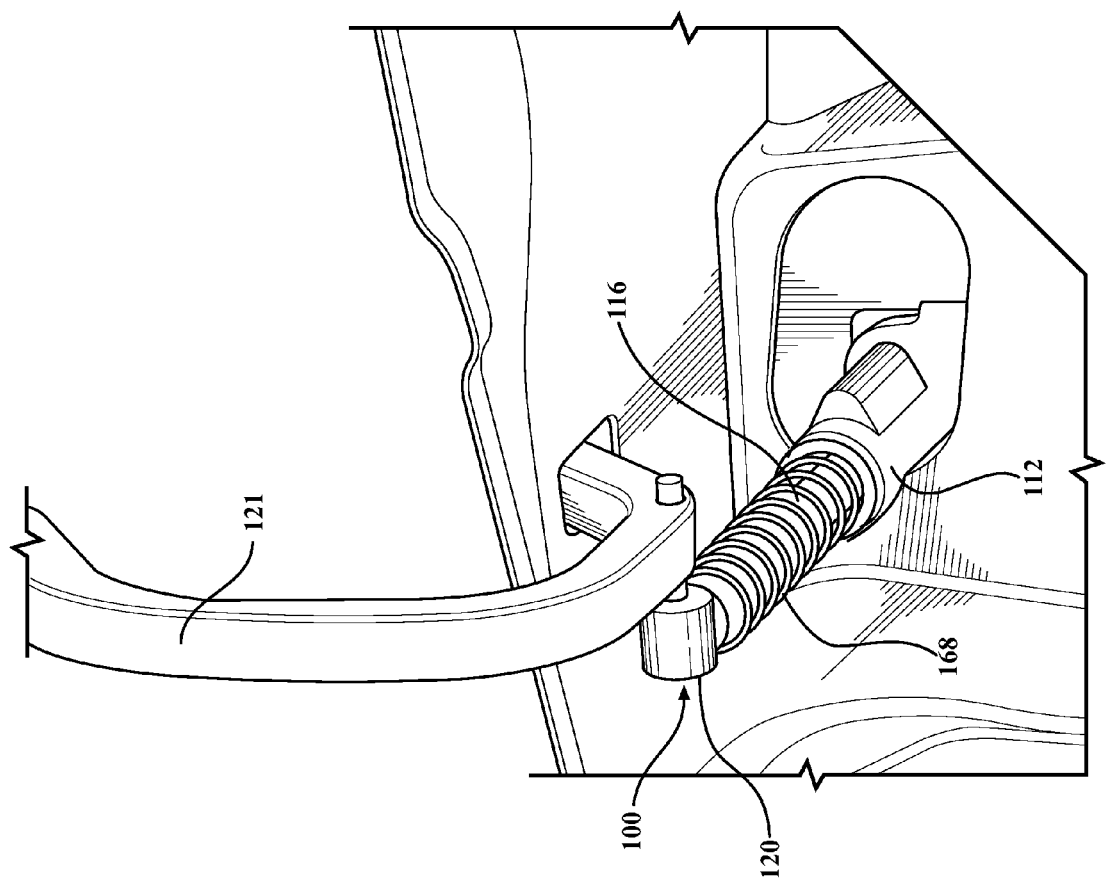

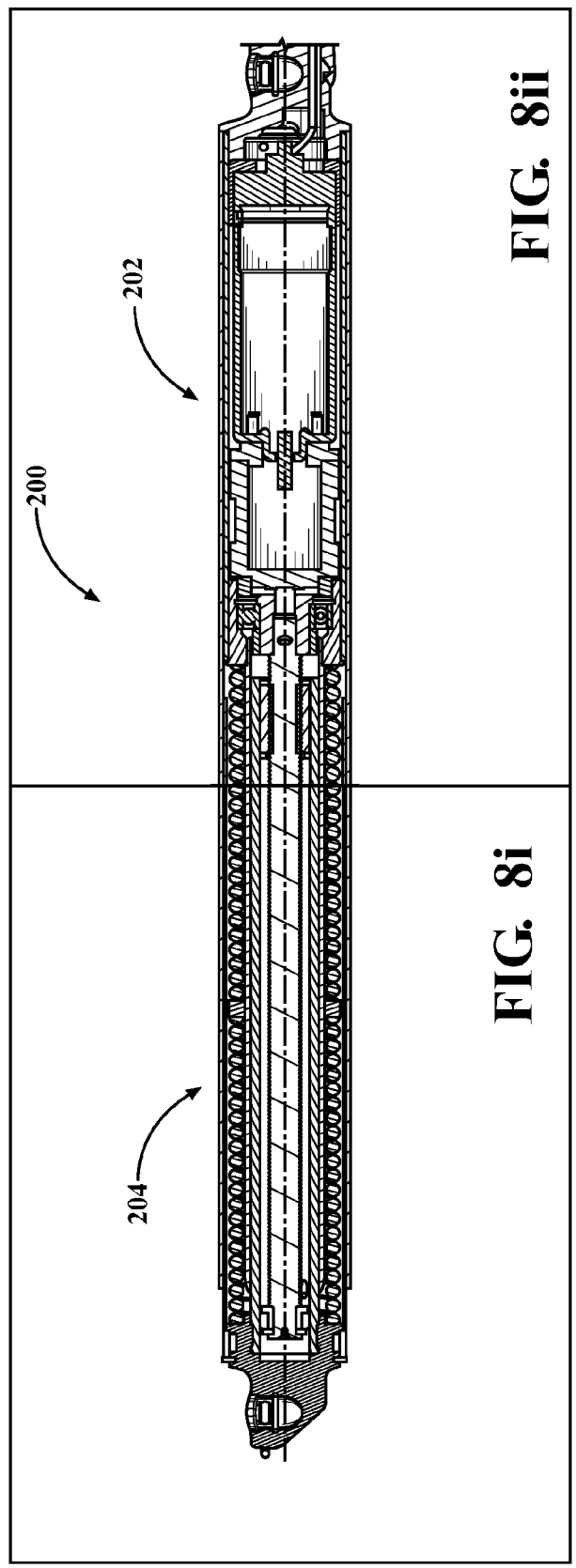

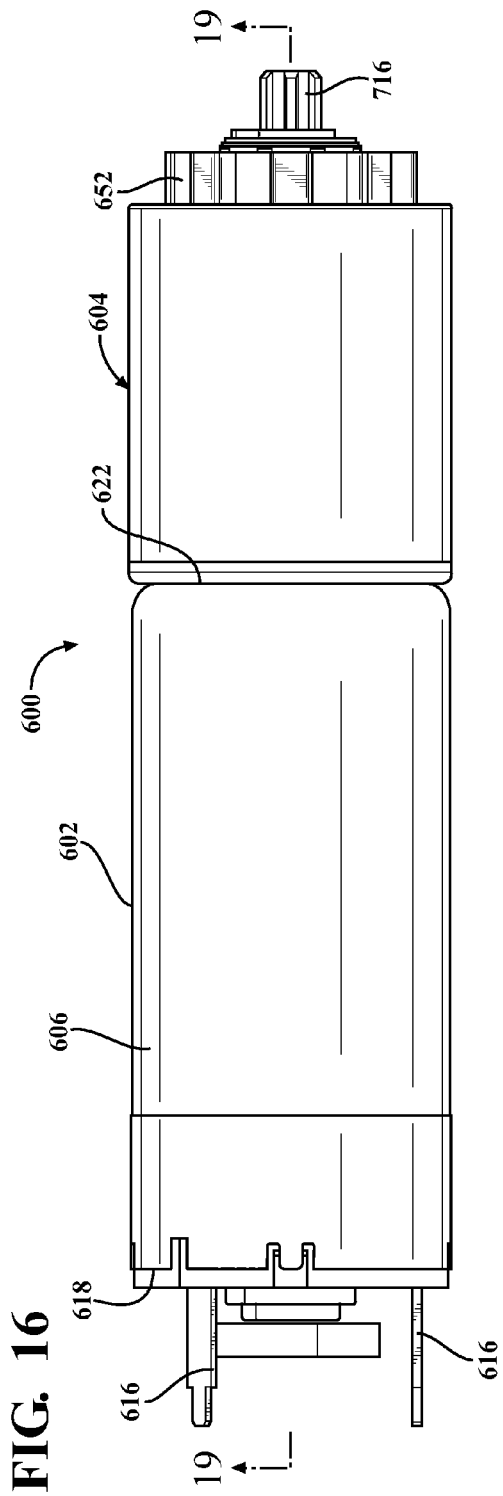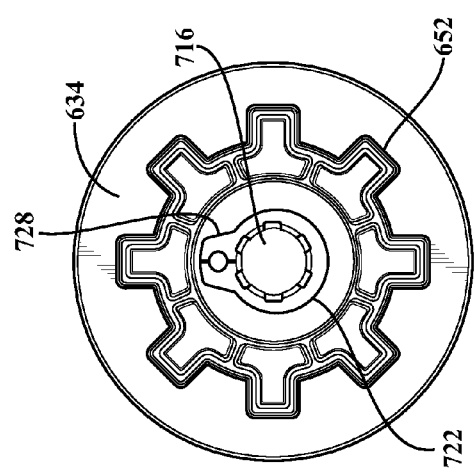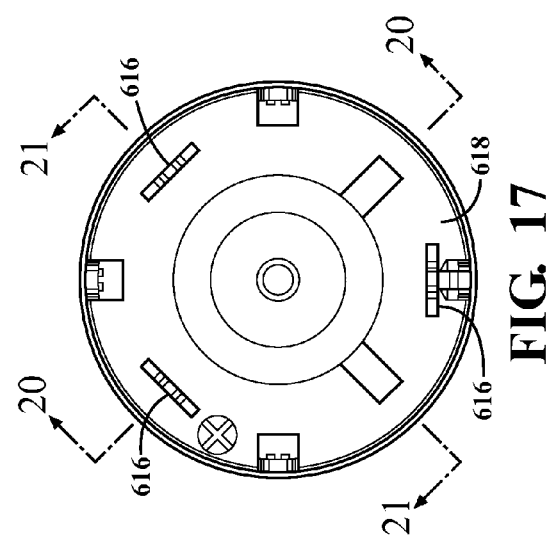
FIG. 16
FIG. 17
FIG. 18

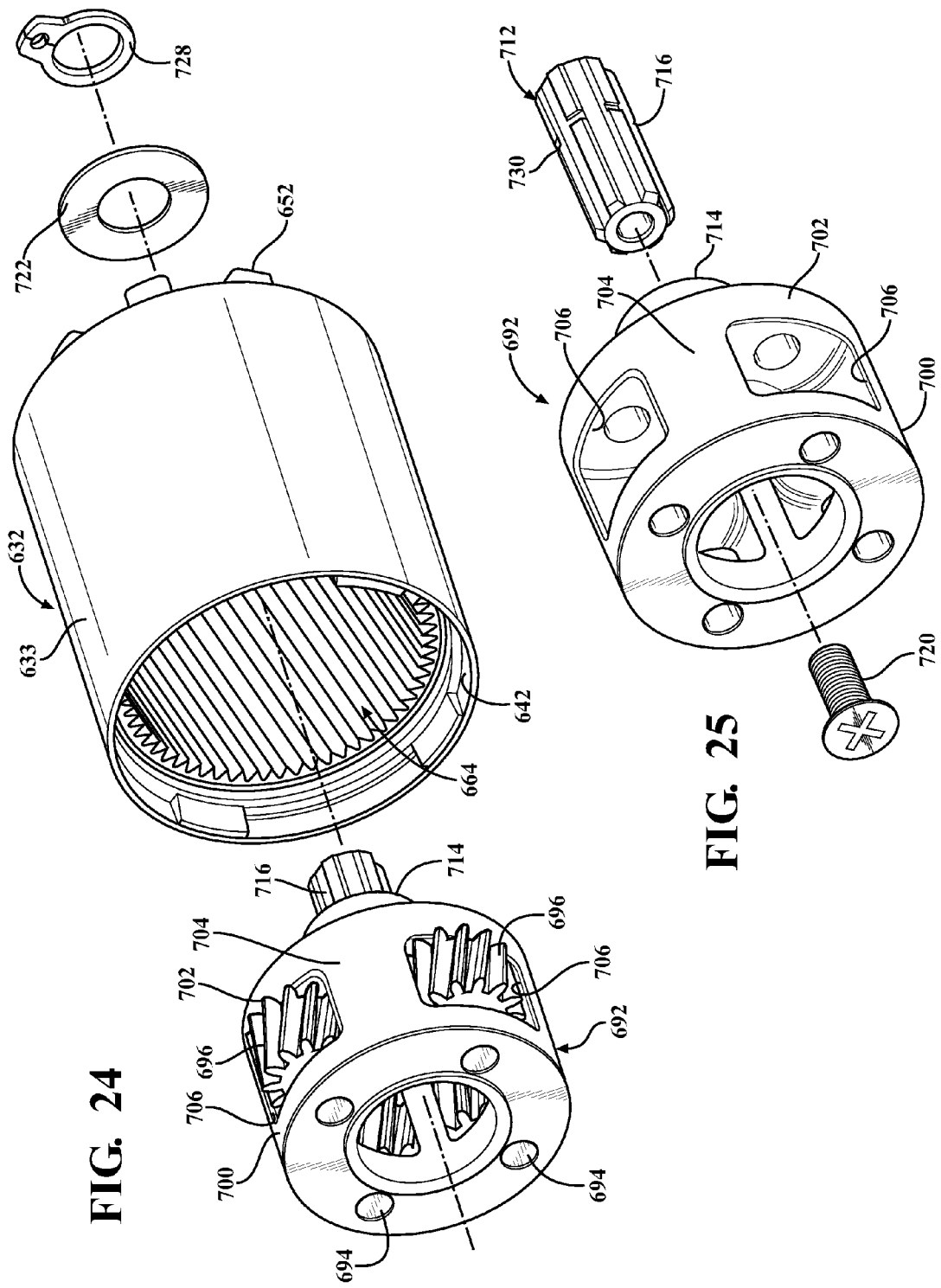

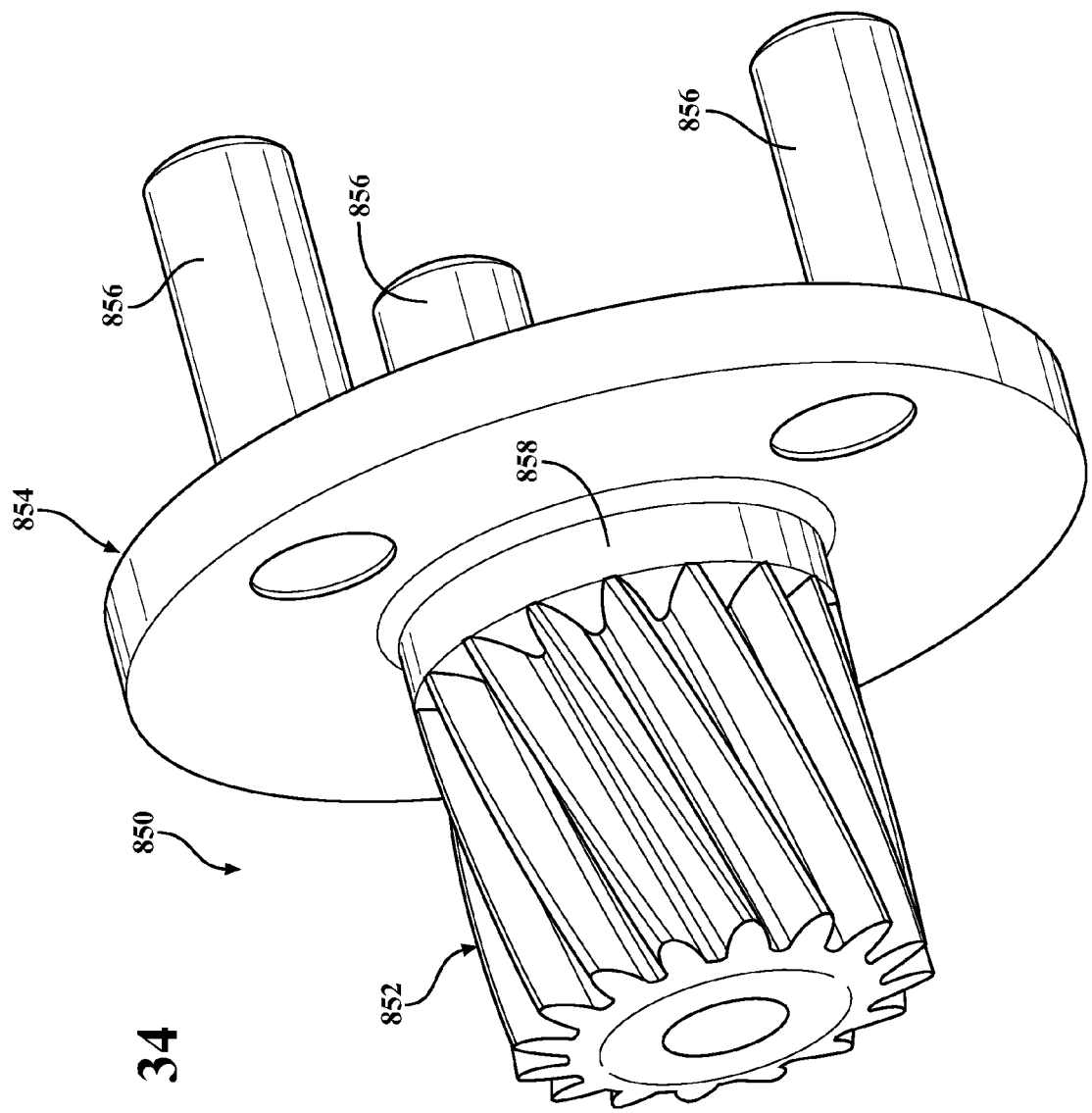

ELECTROMECHANICAL STRUT WITH MOTOR-GEARBOX ASSEMBLY HAVING DUAL STAGE PLANETARY GEARBOX

CROSS-REFERENCE TO RELATED APPLICATIONS

This application claims the benefit of U.S. Provisional Application No. 62/109,157 filed Jan. 29, 2015 and U.S. Provisional Application No. 62/083,419 filed Nov. 24, 2014. The entire disclosure of each of the above applications is incorporated herein by reference.

FIELD

The present disclosure relates generally to a motor-gearbox assembly for an electrically-driven mechanical strut. More particularly, the present disclosure relates to an electromechanical strut used to raise and lower an automotive closure member and having a motor-gearbox assembly equipped with a dual-stage planetary gearbox.

BACKGROUND

This section provides background information which is not necessarily prior art to the inventive concepts associated with the present disclosure.

Lift gates provide a convenient access to the cargo areas of hatchbacks, wagons, and other utility vehicles. Typically, the lift gate is hand operated, requiring manual effort to move the lift gate between open and closed positions. Depending on the size and weight of the lift gate, this effort can be difficult for some users. Additionally, manually opening or closing a lift gate can be inconvenient, particularly when the user's hands are full.

Attempts have been made to reduce the effort and inconvenience of opening or closing a lift gate. One solution is to pivotally mount gas struts to both the vehicle body and the lift gate and which are operable to reduce the force required to open the lift gate. However, gas struts also hinder efforts to subsequently close the lift gate, as the struts re-pressurize upon closing, increasing the effort required. Additionally, the efficacy of gas struts varies according to the ambient temperature. Furthermore, the use of gas struts still requires that the lift gate is manually opened and closed.

Automated power closure systems used to open and close vehicle lift gates are well known in the art and typically include a power actuator that is operable to apply a force directly to the lift gate to enable opening and closing thereof. For example, U.S. Pat. No. 6,516,567 discloses a power actuator that works in tandem with a gas strut. The power actuator comprises an electric motor mounted within the vehicle body that is coupled to a flexible rotary cable by a clutch. The flexible rotary cable drives an extensible strut that is pivotally mounted to both the vehicle body and the lift gate. Thus, the electric motor can be controlled to raise and lower the lift gate conveniently without manual effort. A controller unit is operable to control actuation of the electric motor and can be in communication with a remote key fob button or a button in the passenger compartment, providing additional convenience. However, this type of power actuator is not without its disadvantages. Specifically, the power actuator is comprised of multiple parts, each of which needs to be assembled and mounted to the vehicle separately, increasing costs. The vehicle body must be specifically designed to provide a space to house the electric motor. Due to the limited space available, the motor is small and requires the assistance of the gas strut. Additionally, because the power actuator is designed to work in tandem with a gas strut, the gas strut can still vary in efficacy due to temperature. Thus, the electric motor must be balanced to provide the correct amount of power with varying degrees of mechanical assistance from the gas strut.

U.S. Publication No. US2004/0084265 provides various examples of power actuators working in tandem with gas struts and several alternative examples of electromechanical power actuators. These electromechanical power actuators include an electric motor and reduction gearset coupled via a flexible rotary cable to a second gearset which, in turn, is coupled via a slip clutch to a rotatable piston rod. Rotation of the piston rod causes a spindle drive mechanism to translate an extensible strut that is adapted to be pivotally mounted to one of the vehicle body and the lift gate. The slip clutch functions to permit the piston rod to rotate relative to the gearset when a torque exceeding its preload is exerted on the lift gate so as to accommodate manual operation of the lift gate without damaging the electromechanical power actuator. More specifically, the slip clutch releasably couples the gearset to the piston rod whereby, during normal operation, powered opening and closing of the lift gate is provided. However, when a high level force is applied to the extensible strut which attempts to back drive the spindle drive mechanism in response to excessive or abusive manual operation of the lift gate, the slip clutch momentarily releases the drive connection between the piston rod and the gearset to avoid mechanical damage to the system. A helical compression spring is installed in the power actuator to provide a counter balancing force against the weight of the lift gate.

U.S. Publication No. US2012/0000304 discloses several embodiments of power drive mechanisms for moving trunk lids and lift gates between open and closed positions. The power drive mechanisms have an offset configuration employing an electric motor-driven worm gearset to rotate an externally-threaded jackscrew for translating an extensible strut. A slip clutch is shown to be disposed between an output gear of the worm gearset and the rotatable jackscrew. In addition, a coupler unit is provided between the motor output shaft and the worm of the worm gearset. The coupler unit includes a first coupler member fixed for rotation with the worm shaft, a second coupler member fixed for rotation with the motor output shaft, and a resilient spider interdigitated between fingers extending from the first and second coupler members. The resilient coupler provides axial and circumferential isolation between the first and second coupler members and functions to absorb transient or torsional shock loads between the motor shaft and the worm shaft.

In view of the above, it is evident that electromechanical drive mechanisms of the type used in trunk lid and lift gate powered closure systems are commonly equipped with a motor-driven gearbox. While such electromechanical drive mechanisms perform satisfactorily for their intended purpose, integration of these devices can increase the cost and complexity of powered actuators as well as impact the available vehicle packaging requirements.

It is therefore desired to provide an assembly for raising and lowering a vehicle trunk lid or lift gate that obviates or mitigates at least one of the above-identified disadvantages of the prior art.

SUMMARY

This section provides a general summary of the disclosure and is not a comprehensive disclosure of its full scope or all of its features, aspects or objectives.

Accordingly, it is an aspect of the present disclosure to provide an electromechanical strut for use in a powered closure system in a motor vehicle for controlling movement of a closure member between an open position and a closed position relative to a motor vehicle body.

It is a related aspect of the present disclosure to provide an electromechanical strut for use in a power lift gate system of a motor vehicle.

It is a further aspect of the present disclosure to provide such an electromechanical strut with a motor-gearbox assembly integrating an electric motor unit and a gearbox unit into a common assembly, wherein the gearbox unit includes a dual-stage planetary geartrain configured to include a first stage gearset and a second stage gearset.

As a further aspect of the present disclosure, the dual-stage planetary geartrain of the gearbox unit is configured such that the first stage gearset is driven by a rotary output of the electric motor unit and the second stage gearset is driven by the first stage gearset to provide a torque multiplication and speed reduction function between the rotary output of the electric motor unit and a rotary input of a rotary-to-linear conversion device configured to move the closure member between its open and closed positions.

It is another aspect of the present disclosure to provide an electromechanical strut for moving a pivotal closure member between an open position and a closed position relative to a motor vehicle body. The electromechanical strut includes a housing connected to one of the closure member and the motor vehicle body. An extensible member is slideably moveable relative to the housing and is connected to the other one of the closure member and the motor vehicle body. A drive mechanism is operable for converting rotary motion of a drive member into linear motion of the extensible member for moving the extensible member between a retracted position relative to the housing which corresponds to the closed position of the closure member and an extended position relative to the housing which corresponds to the open position of the closure member. The drive mechanism includes a motor-gearbox assembly having an electric motor unit and a gearbox unit. The electric motor unit includes a rotary output member. The gearbox unit includes a dual-stage planetary geartrain with a rotary input component drivingly coupled to the rotary output member of the electric motor unit and a rotary output component coupled to the rotary drive member of the drive mechanism. The dual-stage planetary geartrain includes a first stage gearset and a second stage gearset which have a plurality of first and second planet gears that are meshed with a common ring gear.

It is yet another aspect of the present disclosure to provide a gearbox unit for interconnecting a rotary output of a motor unit to a rotary drive component. The gearbox unit includes a gearbox housing that defines an internal gearbox chamber and a dual-stage planetary geartrain disposed within the gearbox chamber. The dual-stage planetary geartrain includes a non-rotary ring gear mounted to, or formed integrally with, the gearbox housing. The ring gear has a first ring gear segment and a second ring gear segment which together define a continuous gear tooth pattern. The dual-stage planetary geartrain also includes a first stage gearset and a second stage gearset. The first stage gearset is associated with the first ring gear segment and is driven by the rotary output of the motor unit. The second stage gearset is associated with the second ring gear segment and is driven by the first stage gearset for driving the rotary drive component at a reduced speed ratio relative to the rotary output of the motor unit.

In accordance with these and other aspects of the present disclosure, the gearbox unit includes a gearbox housing adapted to be rigidly secured to a motor housing of the electric motor unit and which is configured to define a common ring gear. The first stage gearset of the dual-stage planetary geartrain includes a first sun gear driven by the motor output, a first planet carrier having a plurality of first pins, and a plurality of first planet gears each being rotatably supported on one of the first pins and in constant meshed engagement with the first sun gear and a first ring gear segment of the common ring gear. The second stage gearset of the dual-stage planetary geartrain includes a second sun gear driven by the first planet carrier, a second planet carrier having a plurality of second pins, and a plurality of second planet gears each being rotatably supported on one of the second pins and in constant meshed engagement with the second sun gear and a second ring gear segment of the common ring gear. The dual-stage planetary geartrain also includes an output shaft that is driven by the second planet carrier and which extends axially from the gearbox housing. The first and second ring gear segments of the common ring gear are configured to define a continuous helical gear tooth pattern adapted to mesh with helical first planet gears and helical second planet gears which, in turn, respectively mesh with helical first and second sun gears.

In accordance with the present disclosure, an electromechanical strut is provided for moving a pivotal closure panel relative to a motor vehicle body between a closed position and an open position. The electromechanical strut comprises a housing pivotally mountable to one of the motor vehicle body and the closure panel; an extensible shaft having a first end slidably mounted to the housing and a second end pivotally mounted to the other of the motor vehicle body and the closure panel; and a drive mechanism including a motor-gearbox assembly and a power screw rotatably driven by the motor-gearbox assembly for converting rotary motion into linear motion of the extensible shaft in order to move it between a retracted position corresponding to the closed position of the closure panel and an extended position corresponding to the open position of the closure panel. The motor-gearbox assembly includes an electric motor unit and a gearbox unit, wherein the gearbox unit is equipped with a dual-stage planetary geartrain configured to provide torque multiplication and speed reduction functionality between the electric motor unit and the power screw.

These and other alternative embodiments are directed to providing an electromechanical strut for use in a powered closure system of a motor vehicle and having an electric motor unit and a dual-stage planetary reduction unit integrated into a common motor-gearbox assembly to provide enhanced operation in a compact arrangement.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all implementations, and are not intended to limit the present disclosure to only that actually shown. With this in mind, various features and advantages of example embodiments of the present disclosure will become apparent from the written description when considered in combination with the appended Figures, wherein:

FIG. 1 is a perspective view of a motor vehicle having a powered lift gate system equipped with a pair of electromechanical struts at least one of which is constructed in accordance with the teachings of the present disclosure;

FIG. 2 is a sectional view of an electromechanical strut constructed in accordance with a first embodiment of the present disclosure and shown in an extended position;

FIG. 3 is a sectional view of a spring housing associated with the electromechanical strut shown in FIG. 2;

FIGS. 7A and 7B are perspective views of the electromechanical strut from FIG. 6 shown in different mounting positions for pivoting a vehicle trunk lid;

Figure 8I:
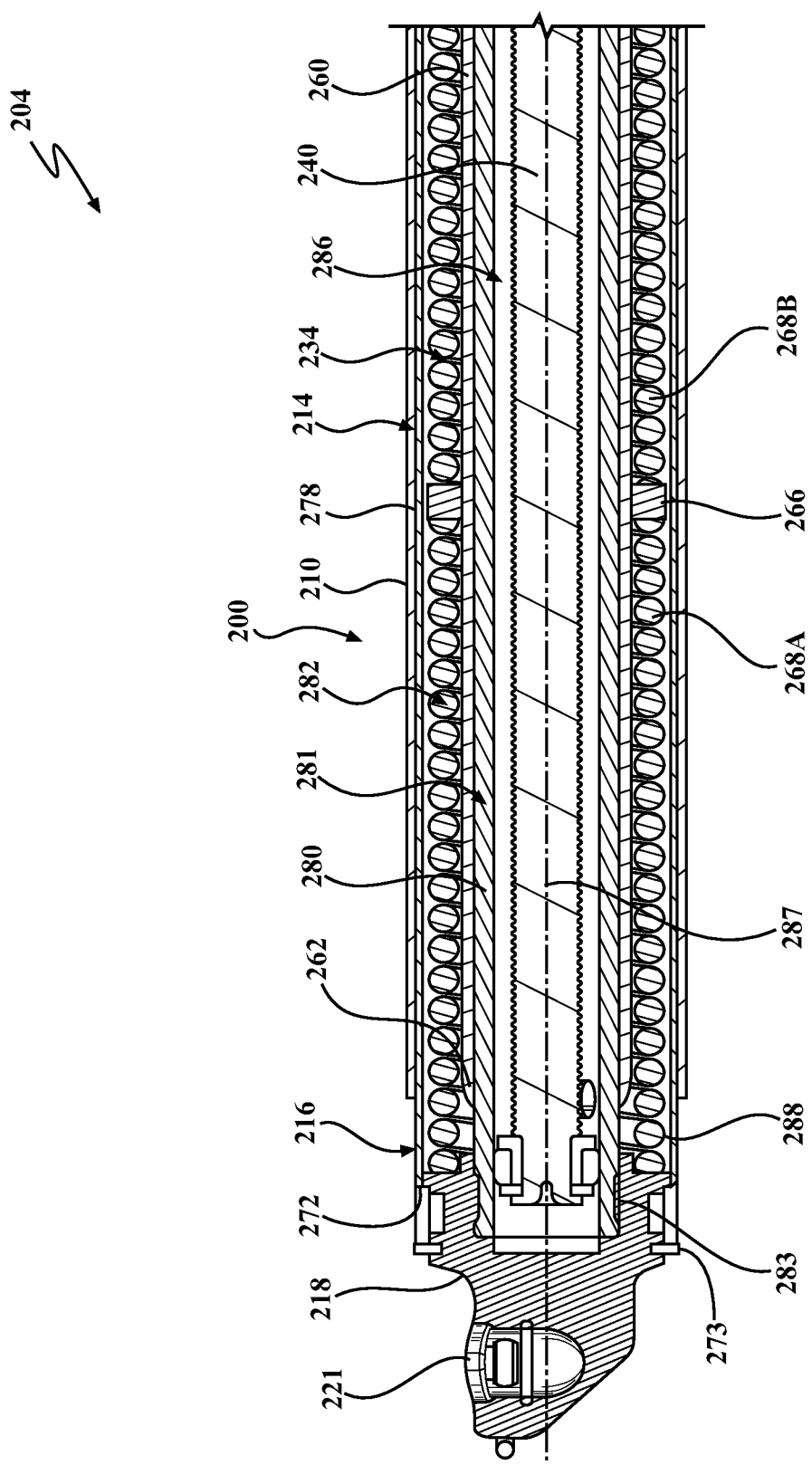
Figure 8I:
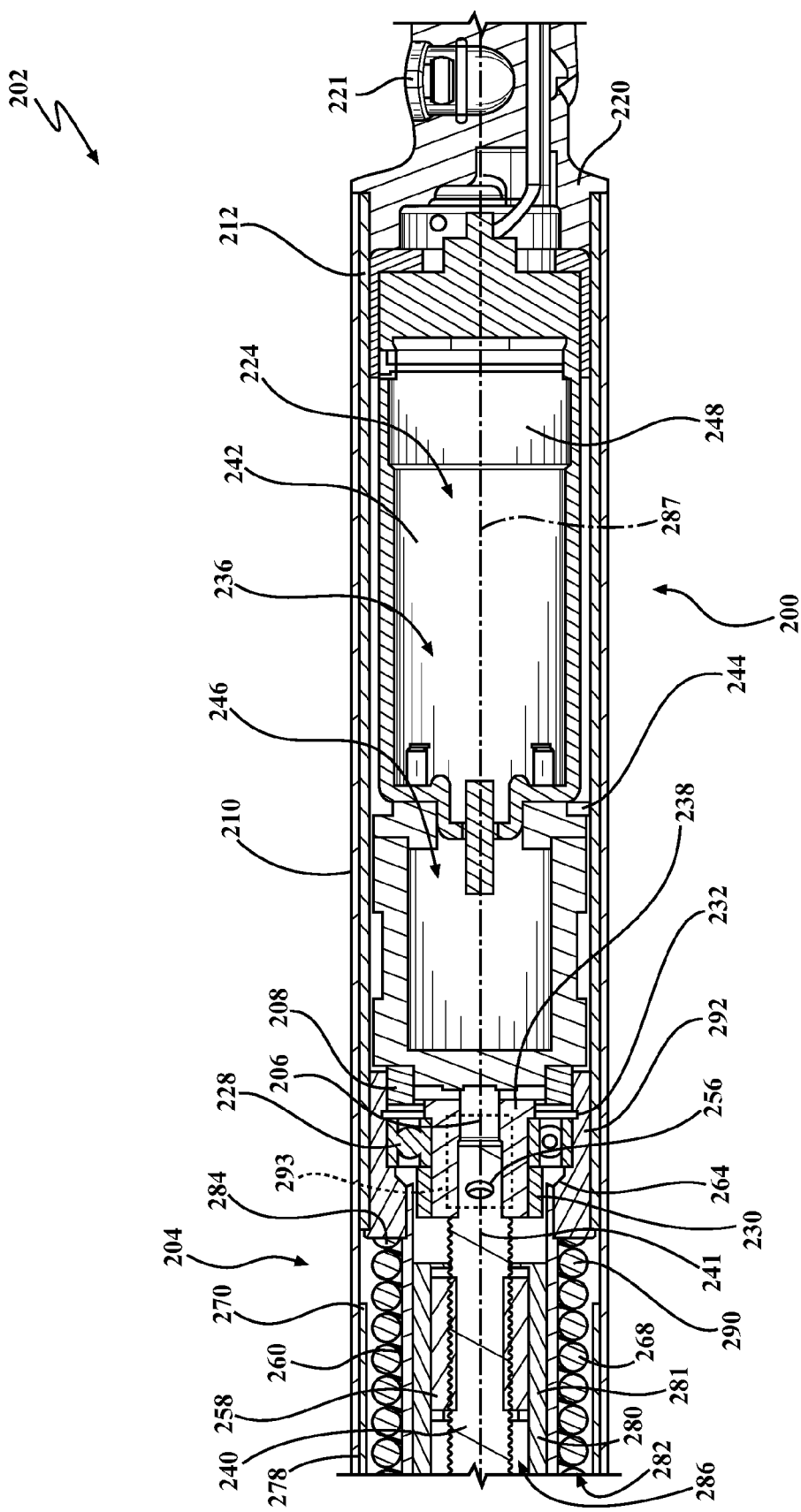
Figure 9:
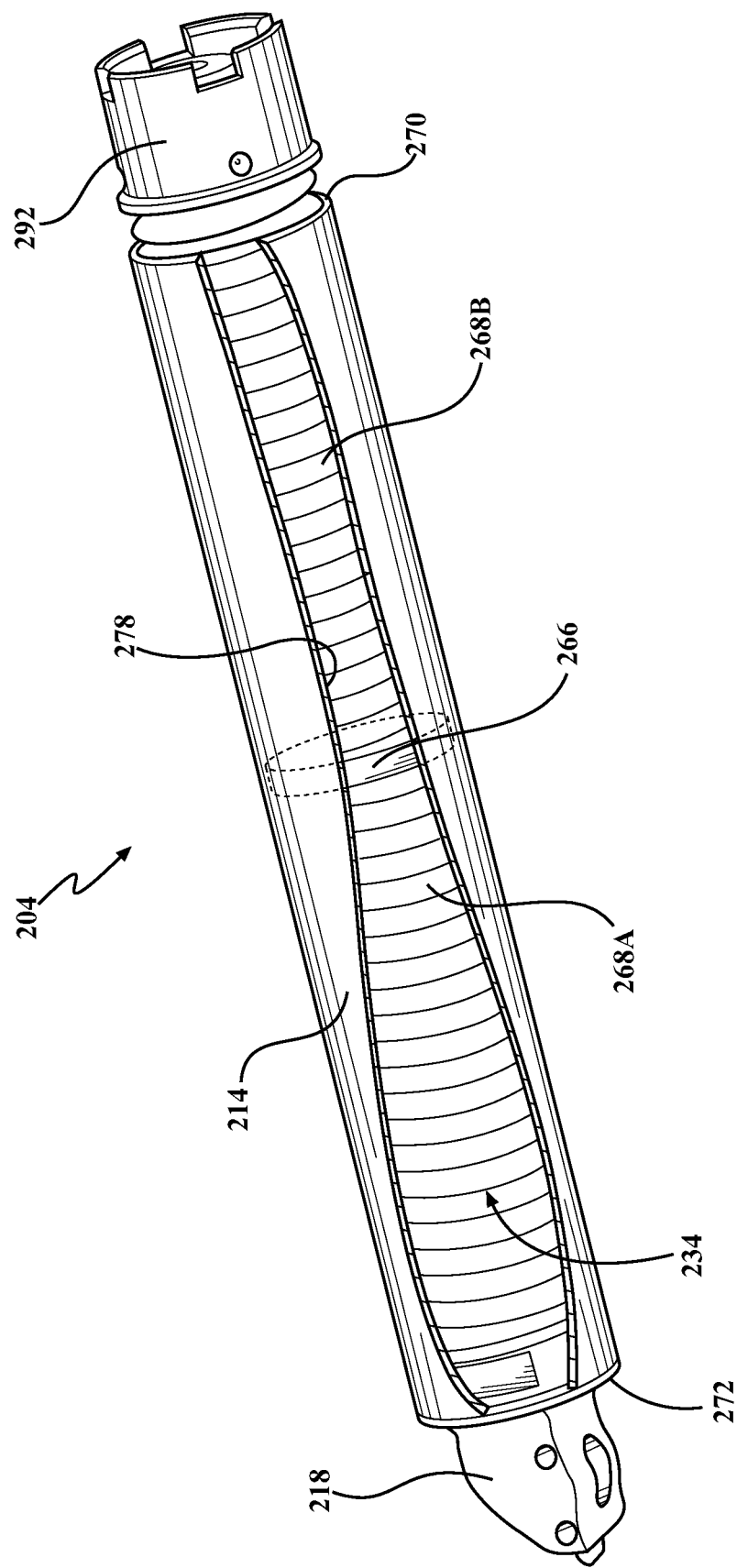
Figure 10:
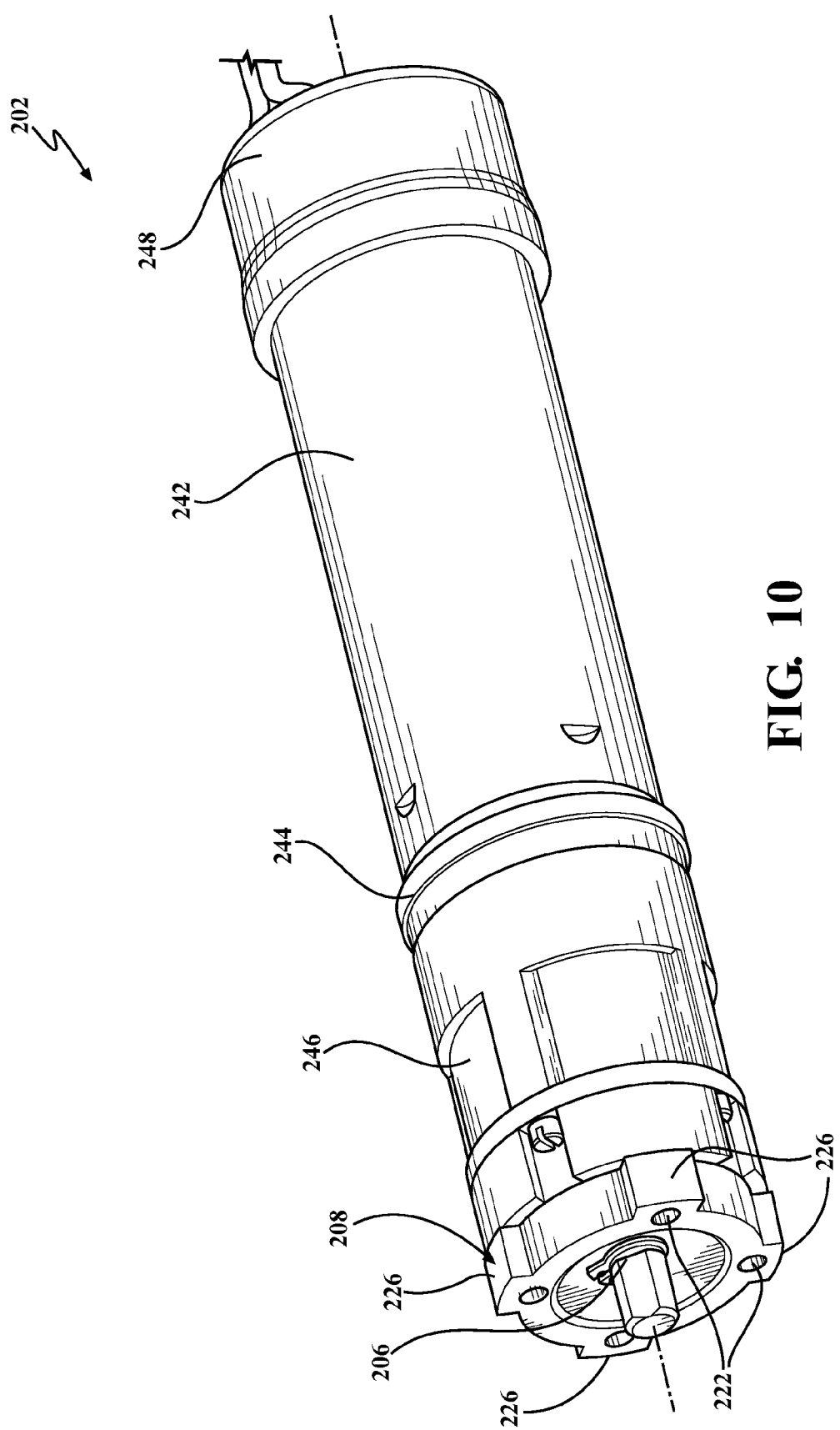
Figure 11:
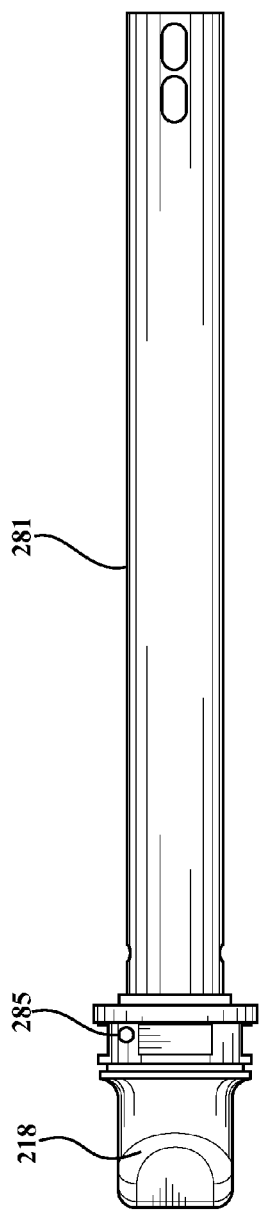
Figure 12:
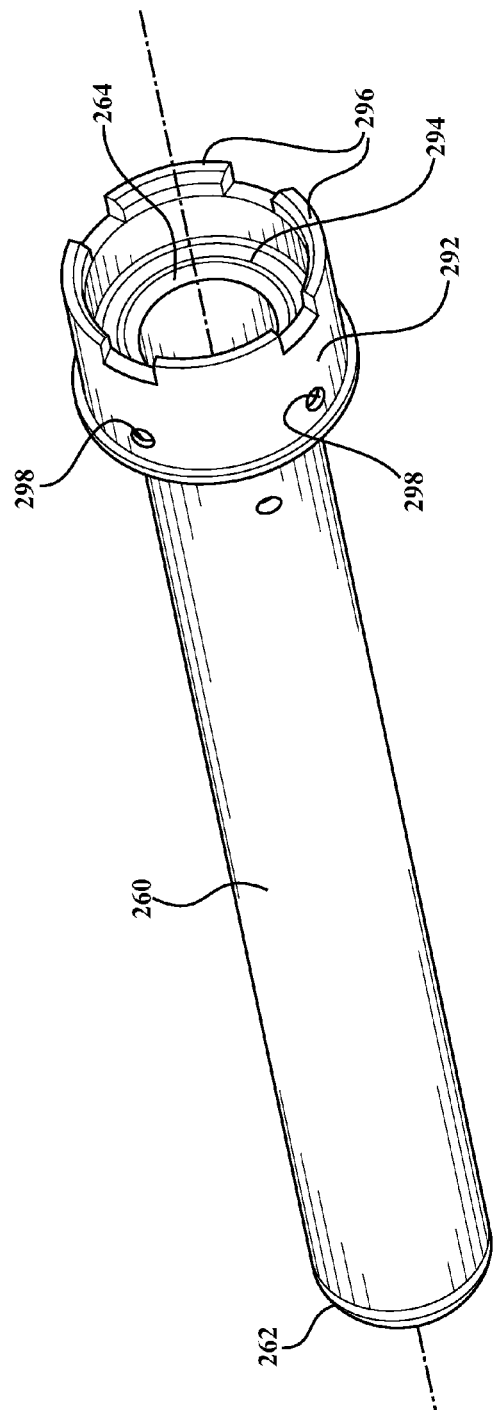
Figure 13:
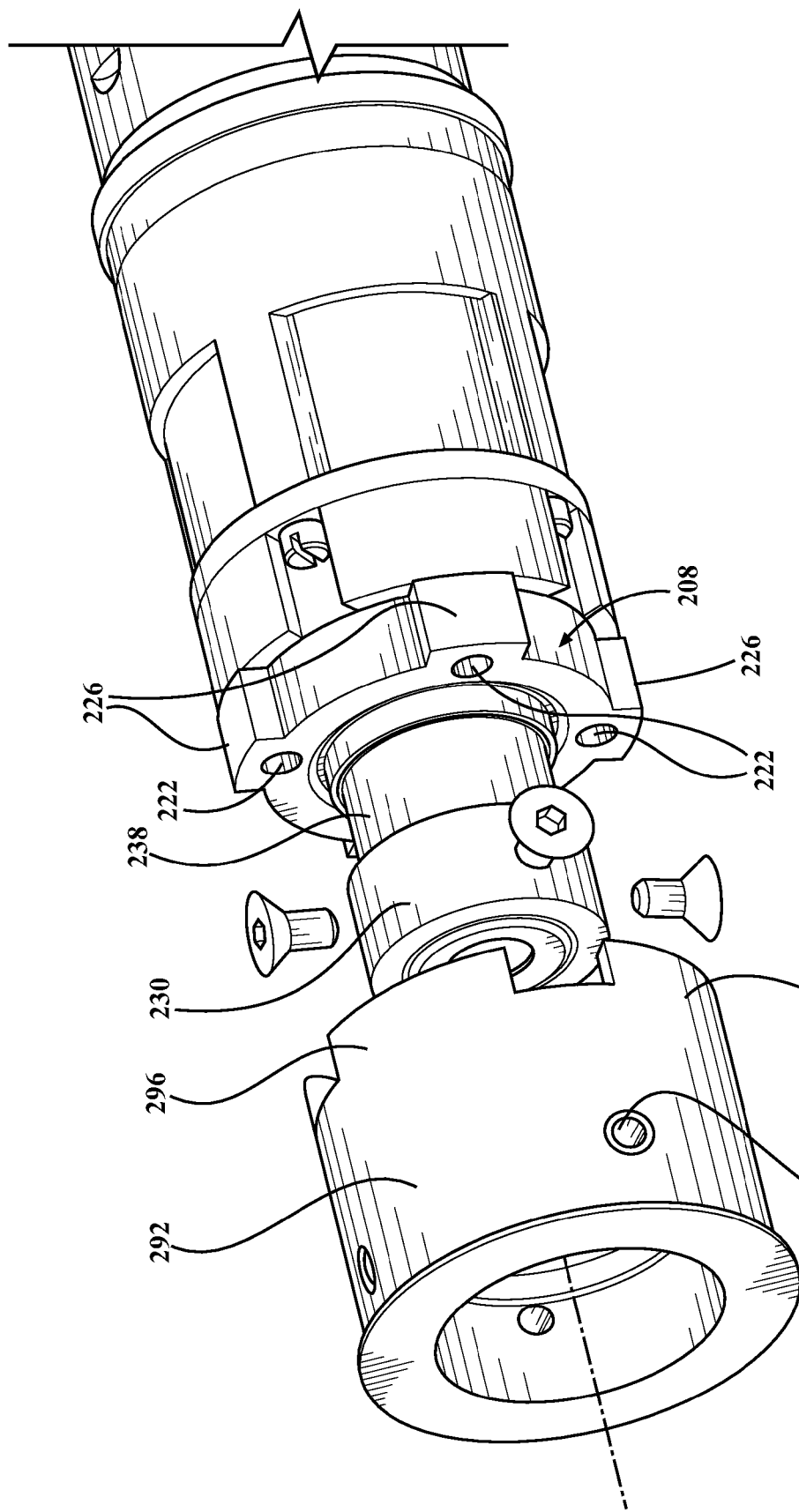
Figure 14:
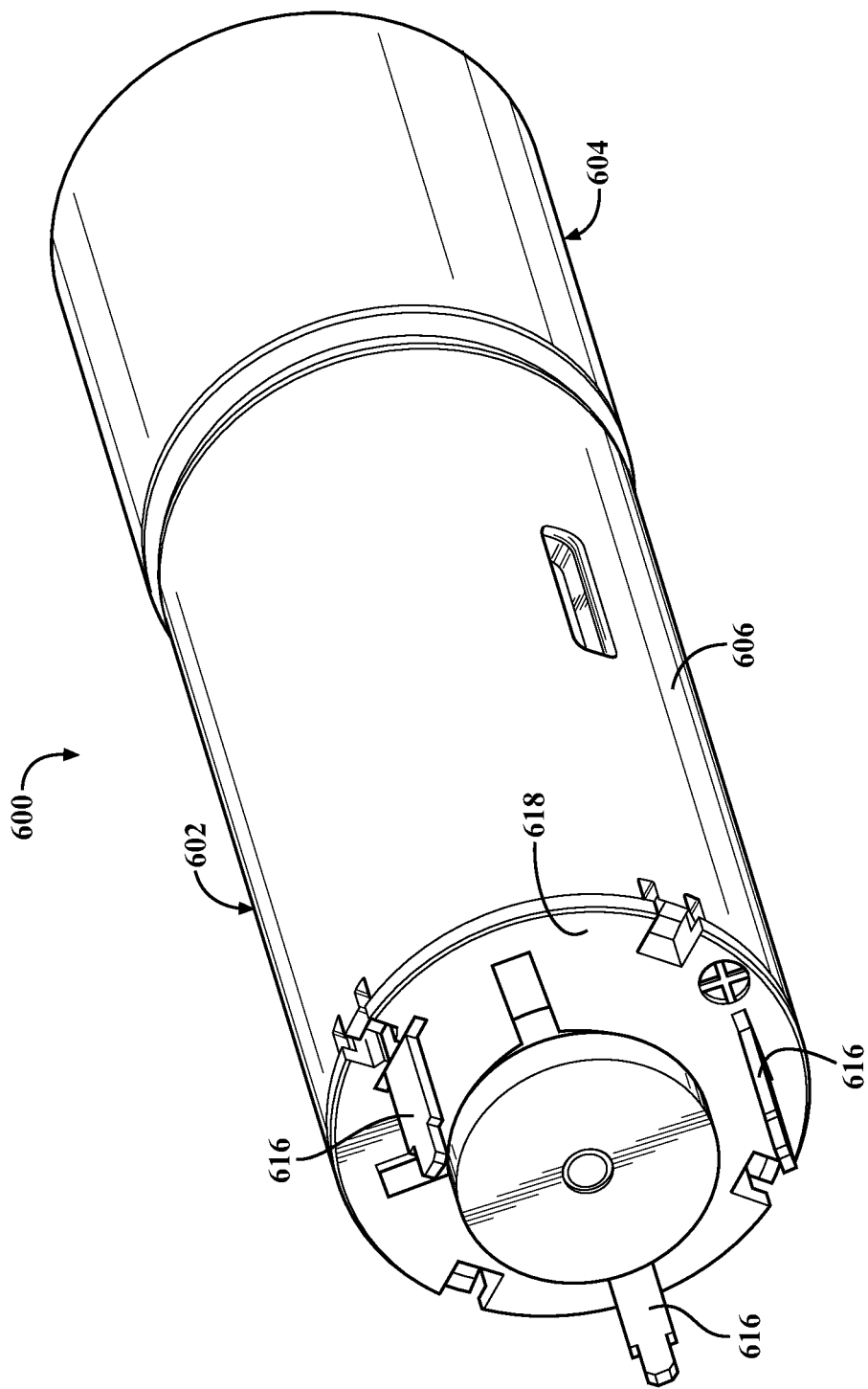
Figure 15:
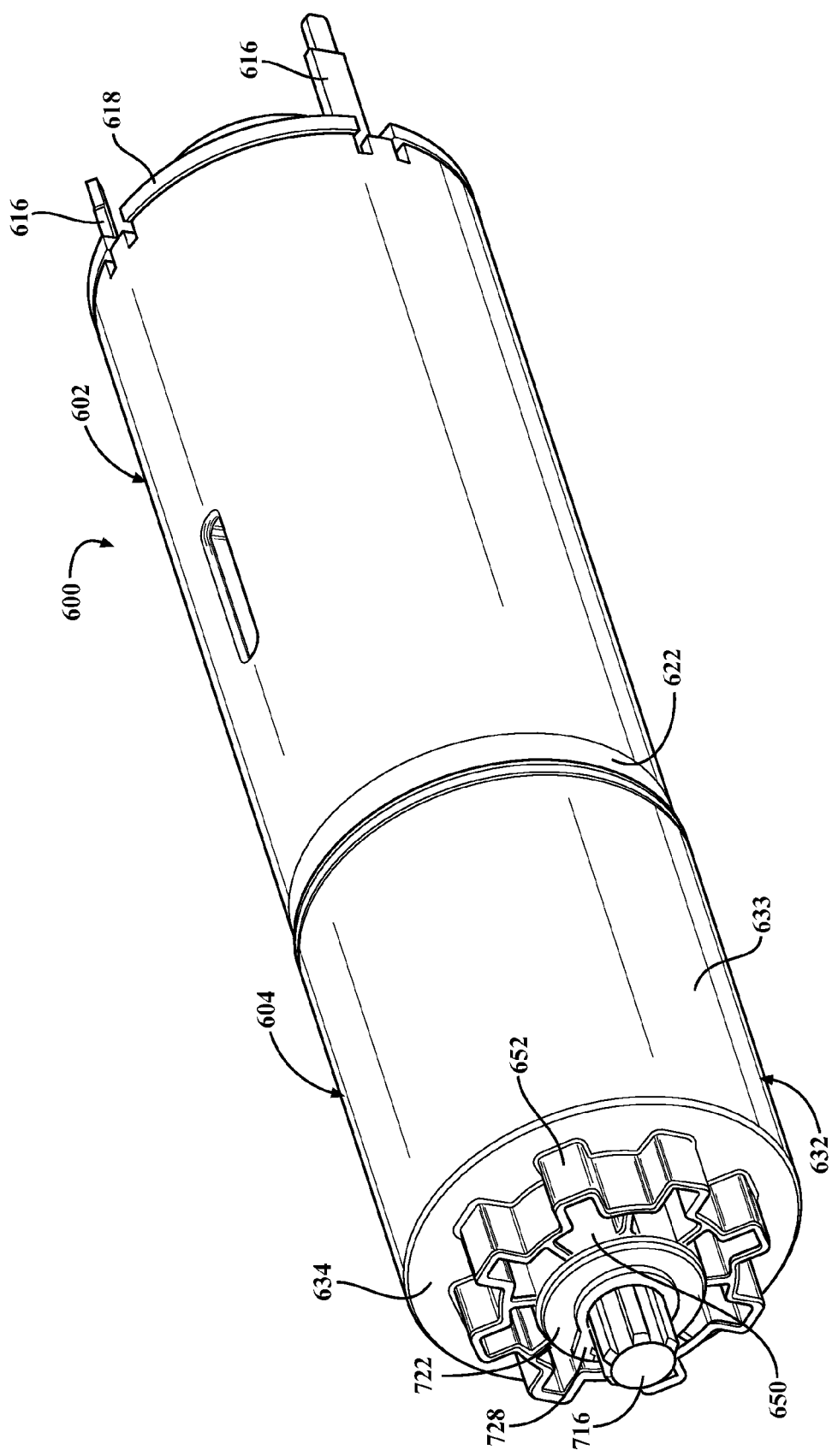
Figure 19:
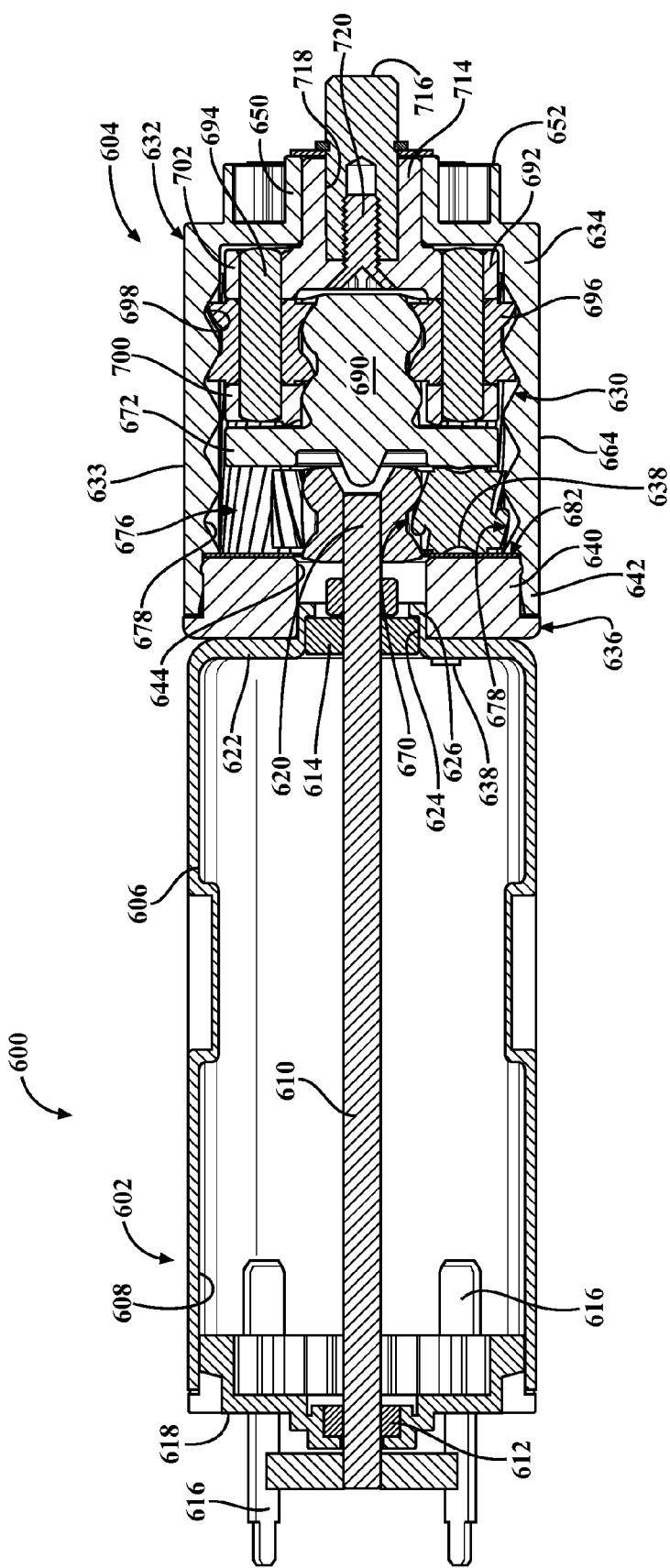
Figure 20:
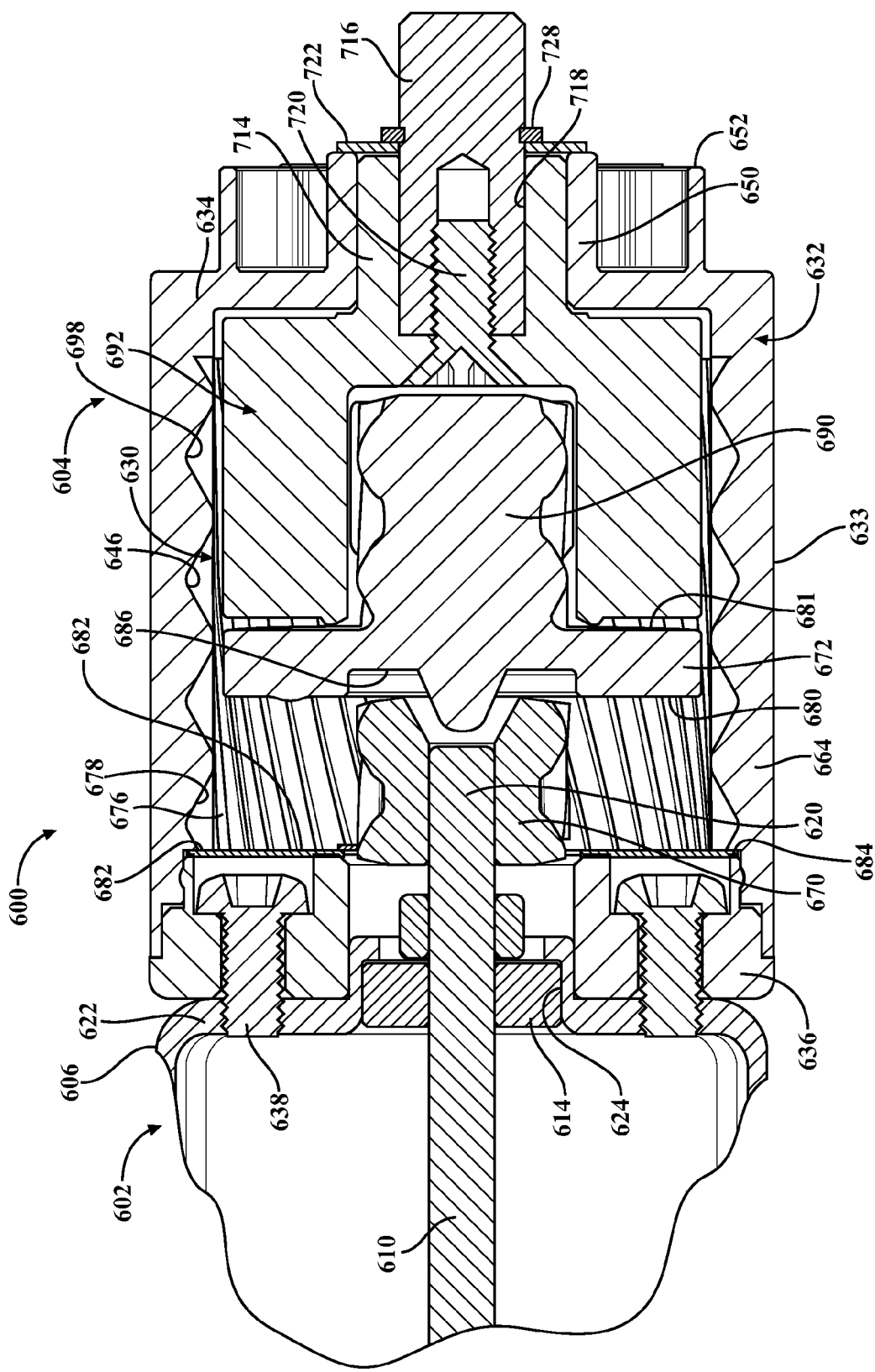
Figure 21:
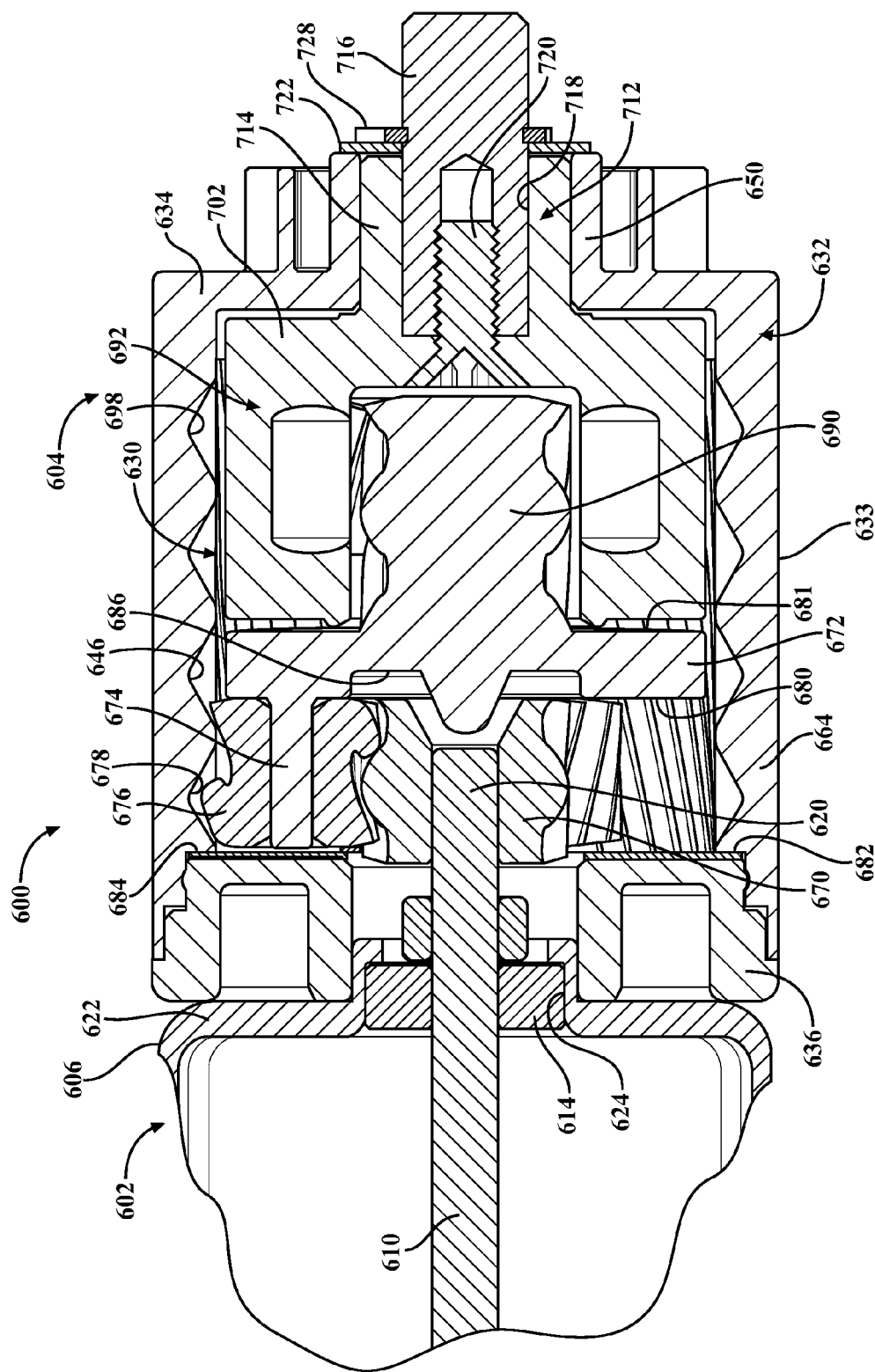
Figure 22:
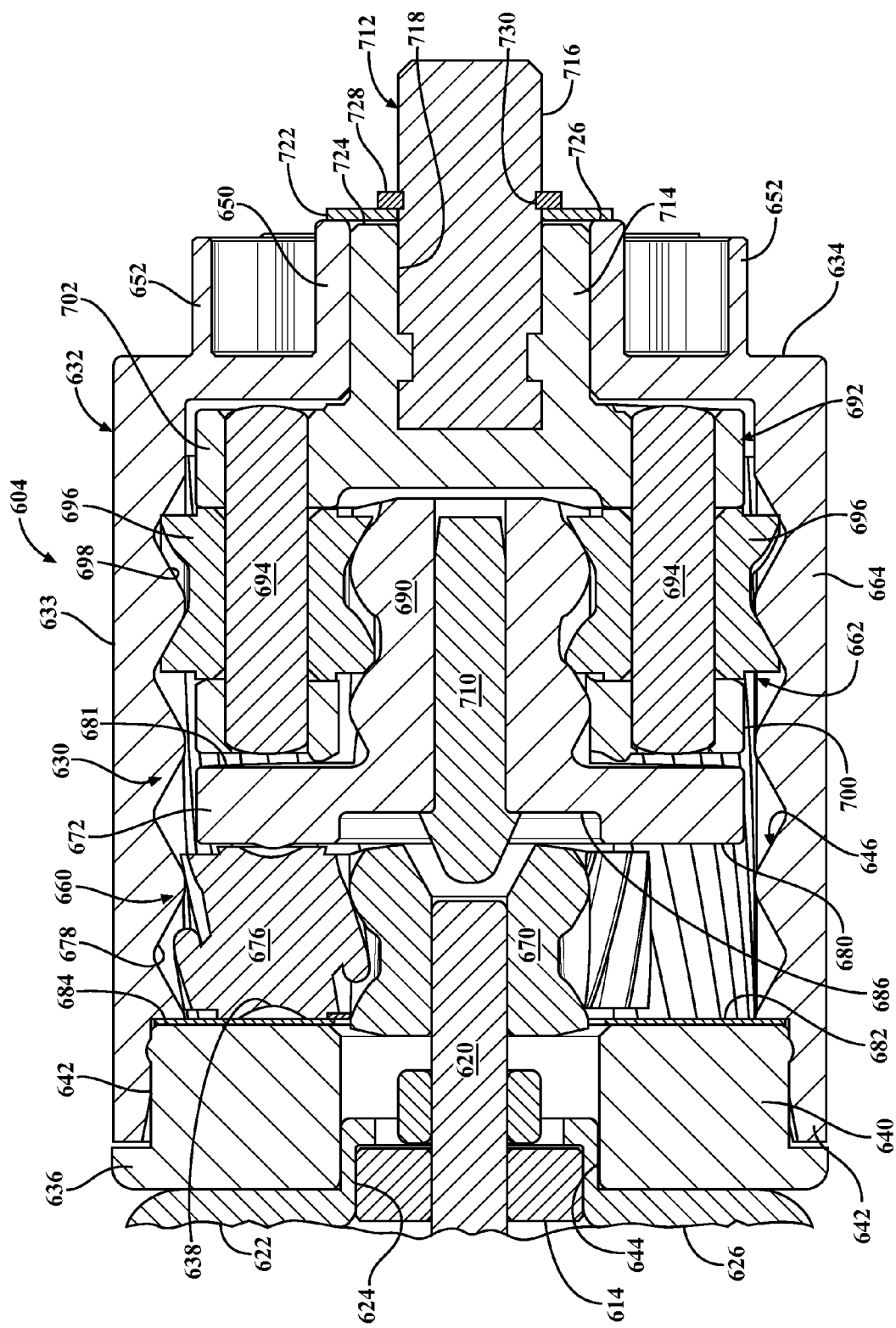
Figure 23:
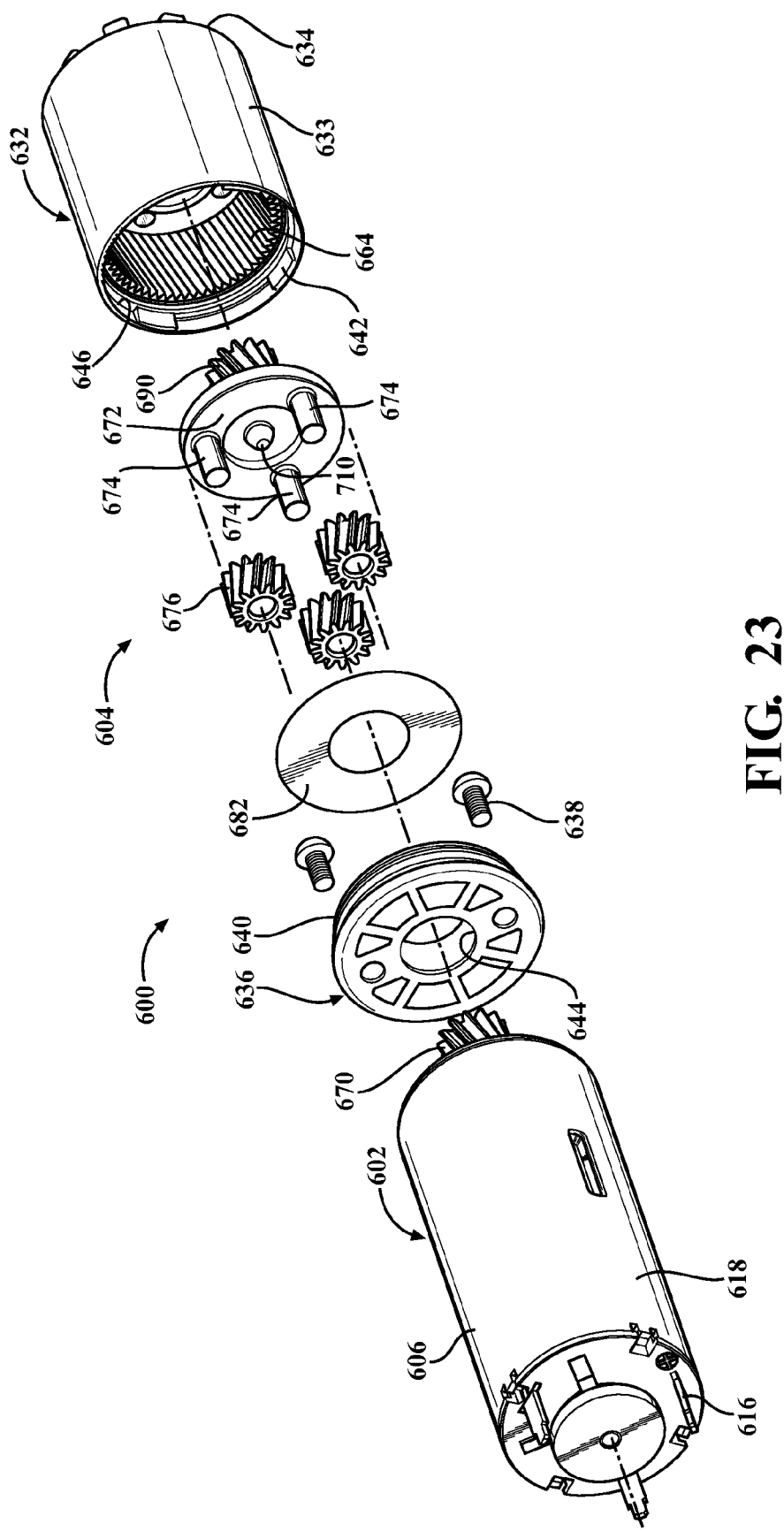
Figure 26:
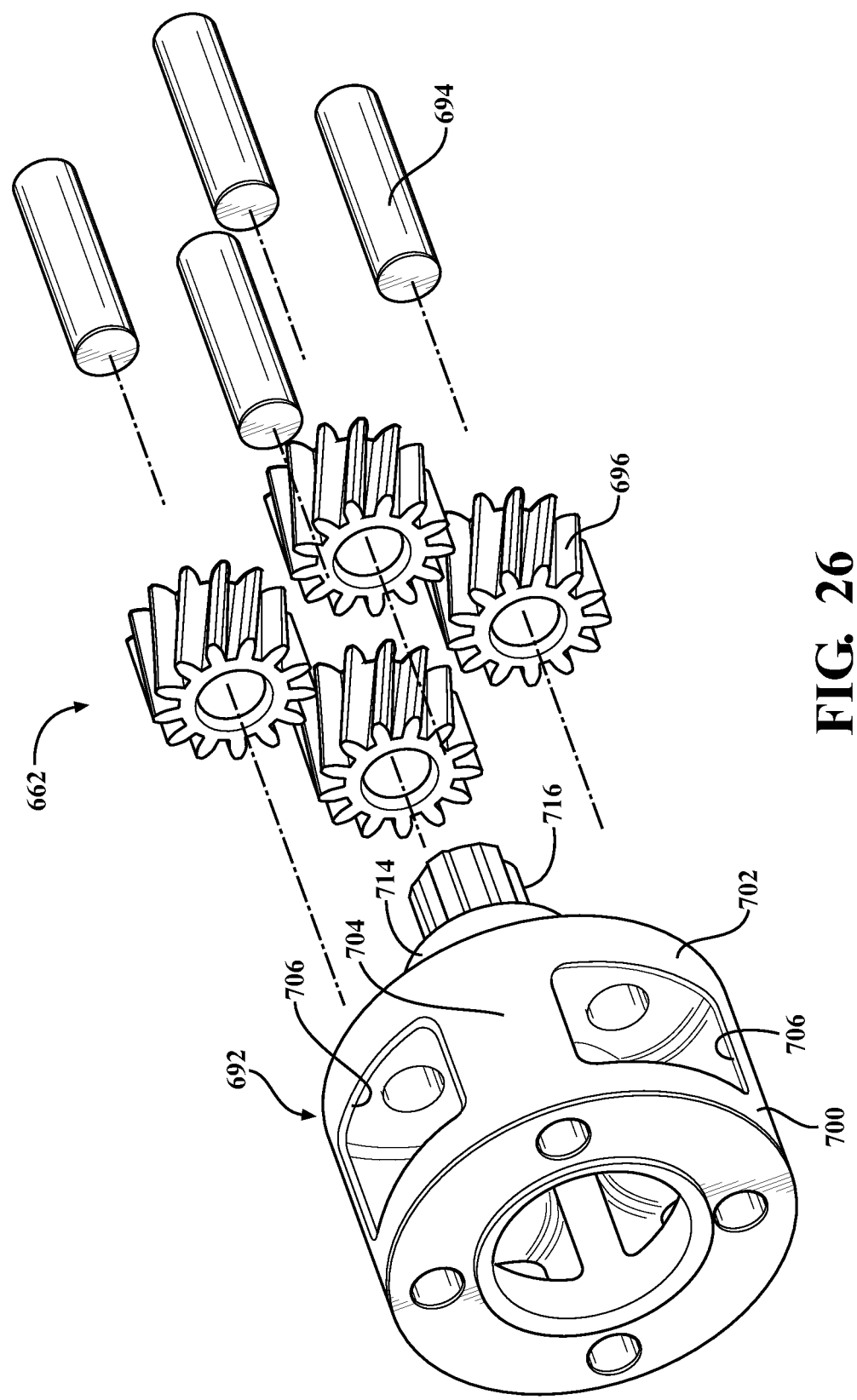
Figure 27:
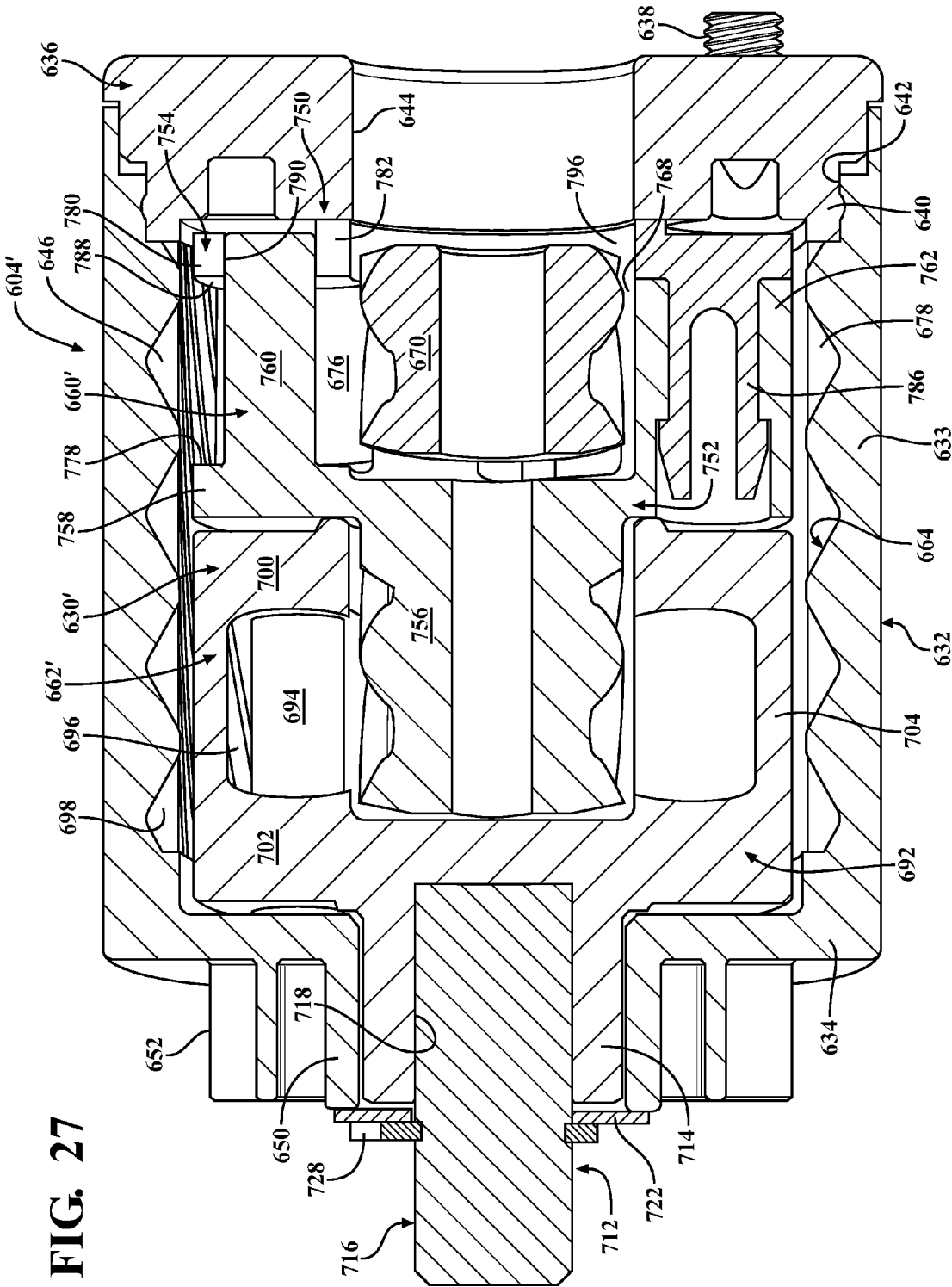
Figure 28:
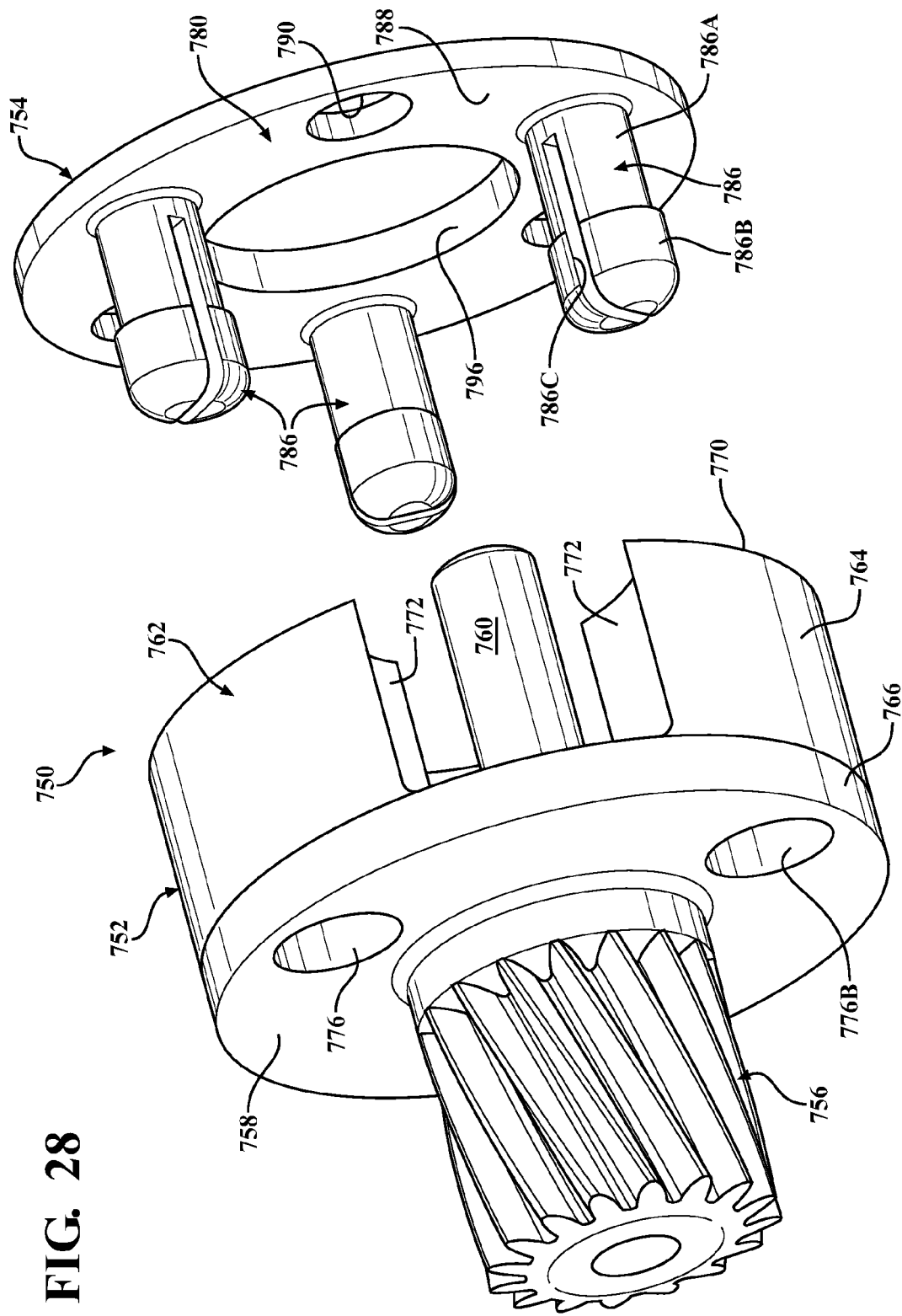
Figure 29:
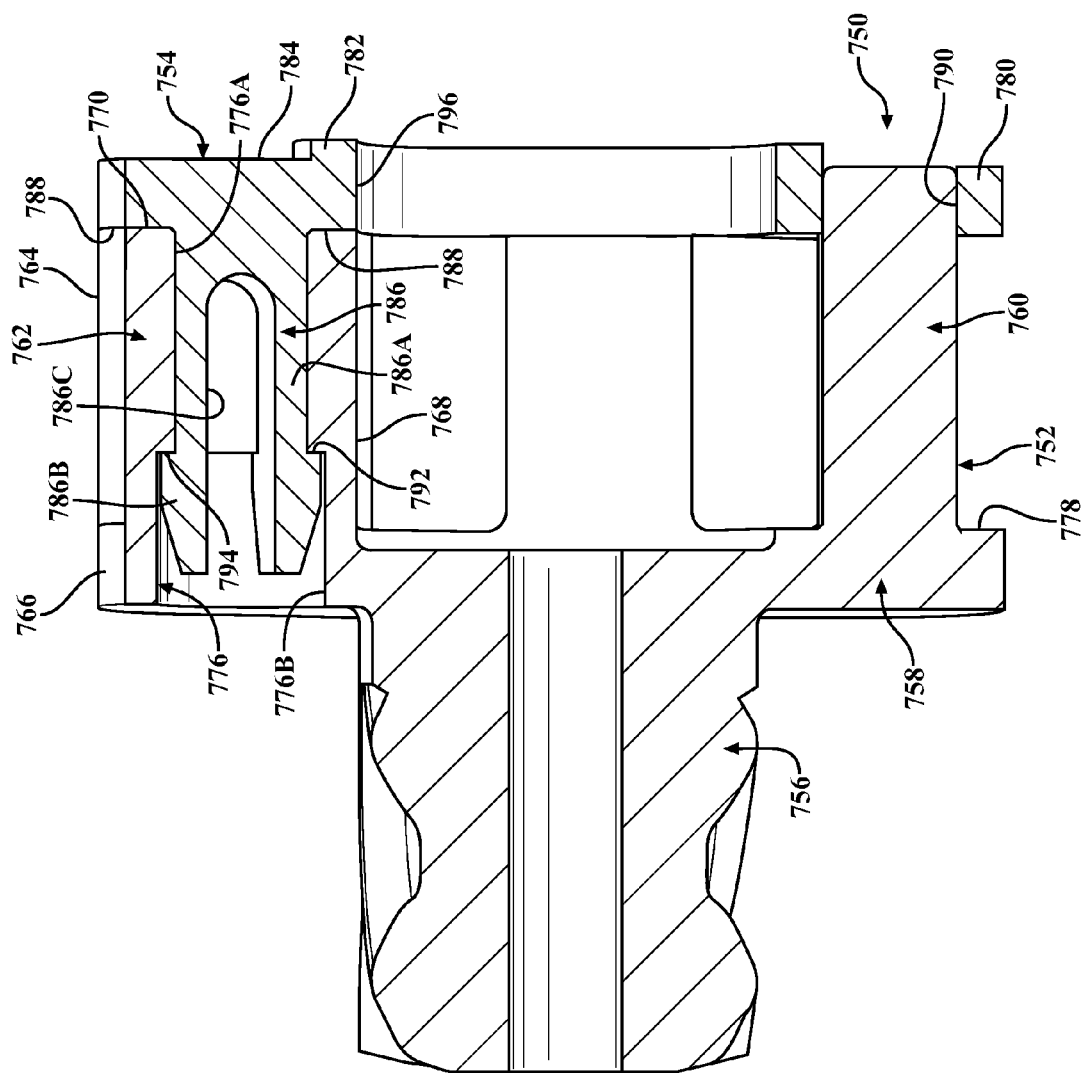
Figure 30:
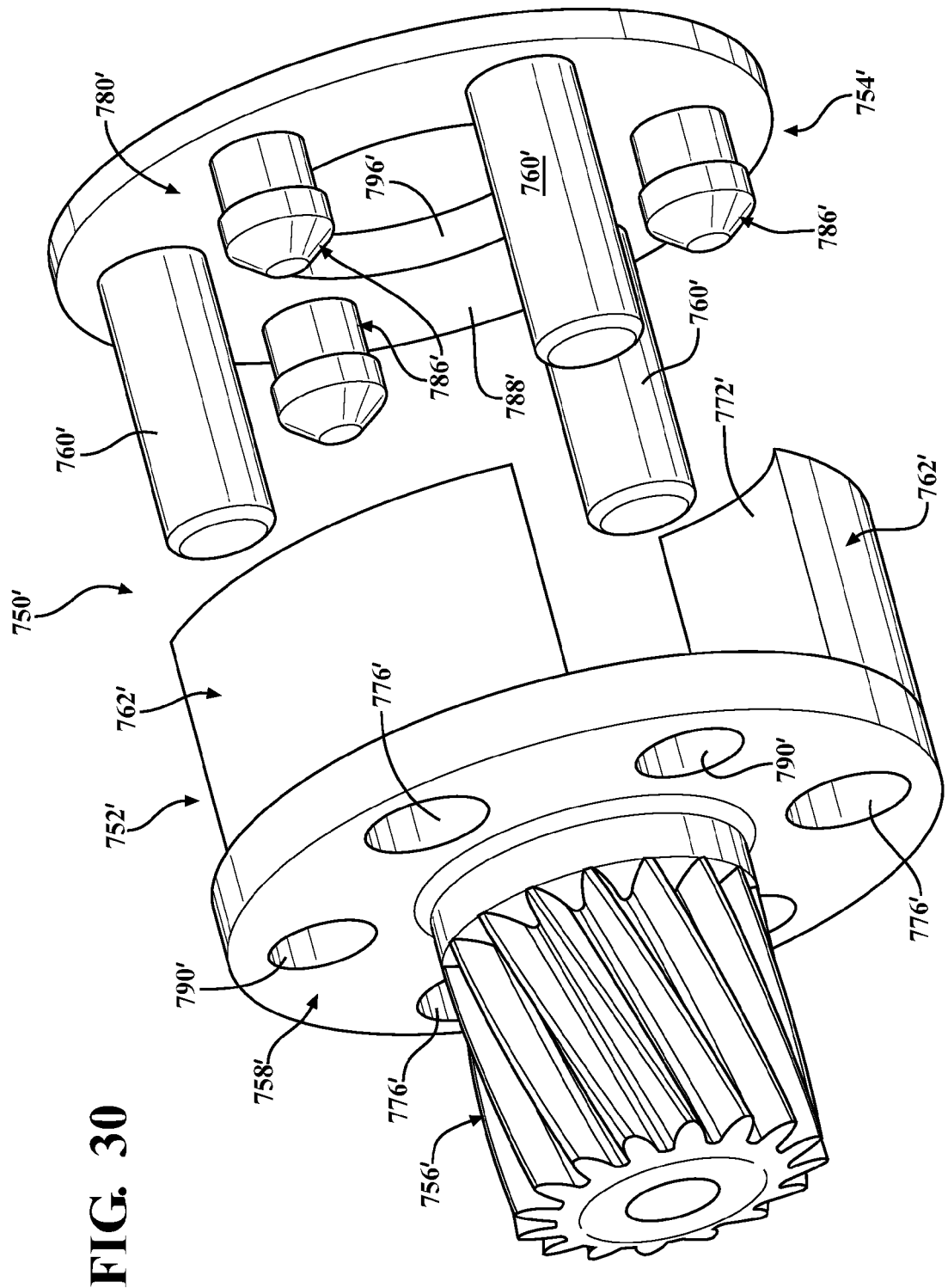
Figure 31:
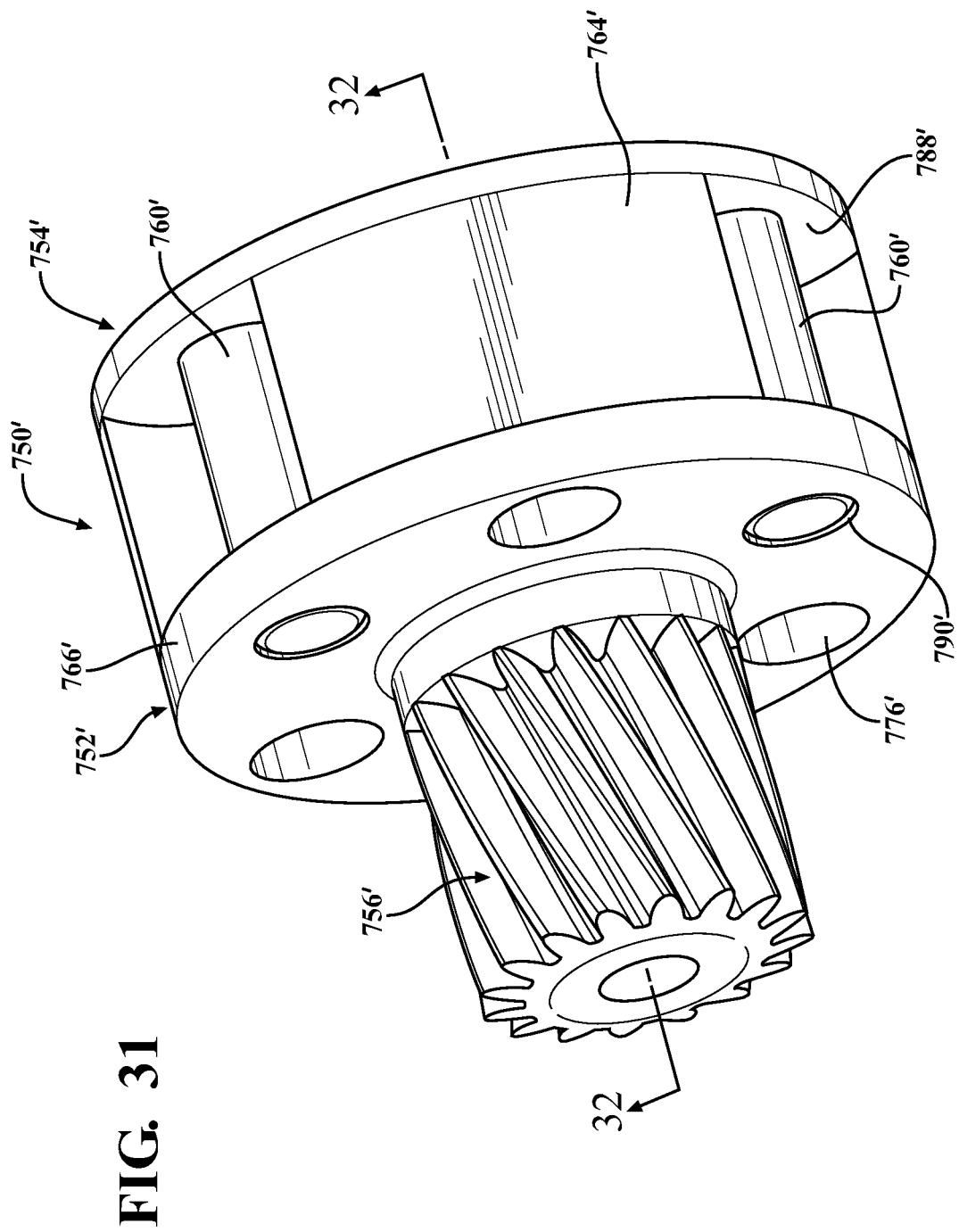
Figure 32:
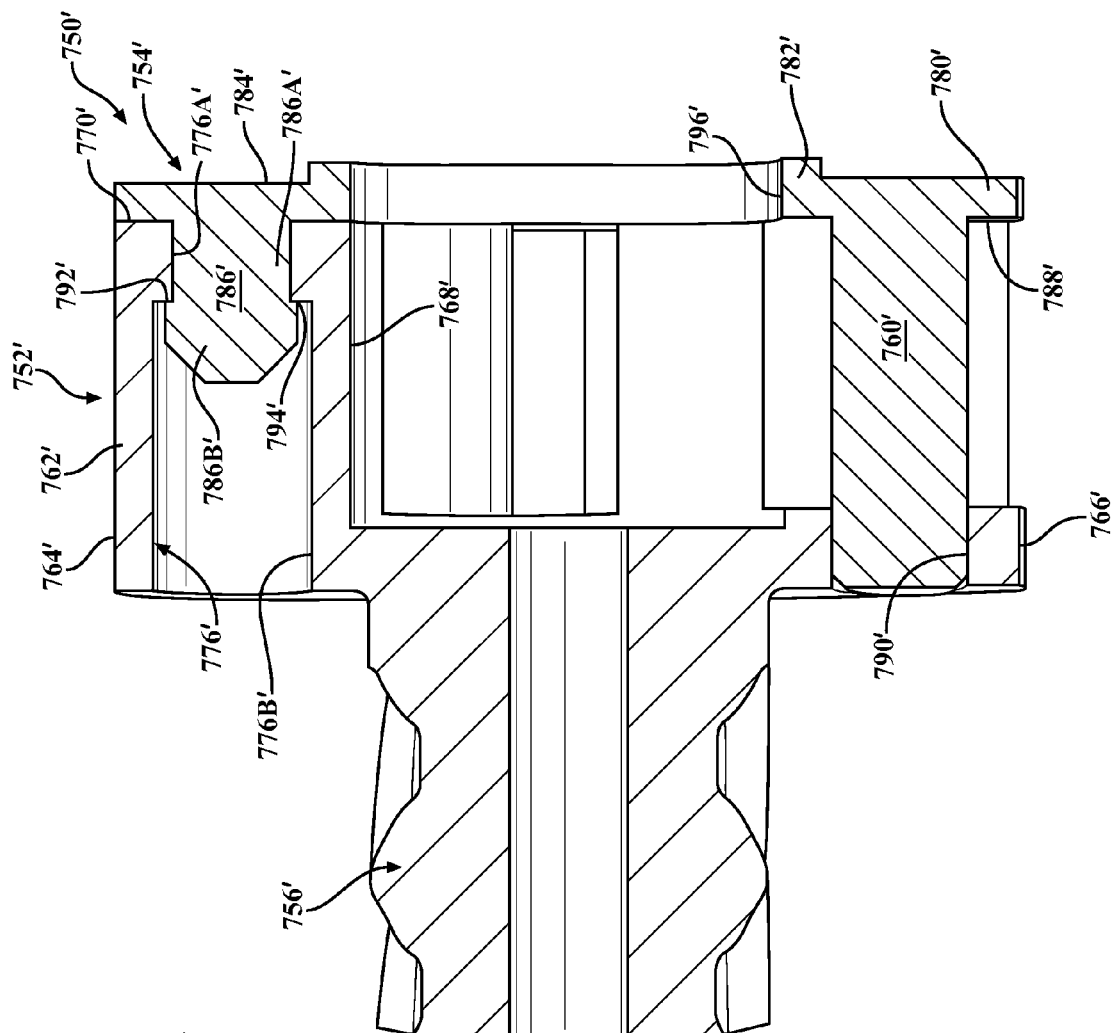
Figure 33:
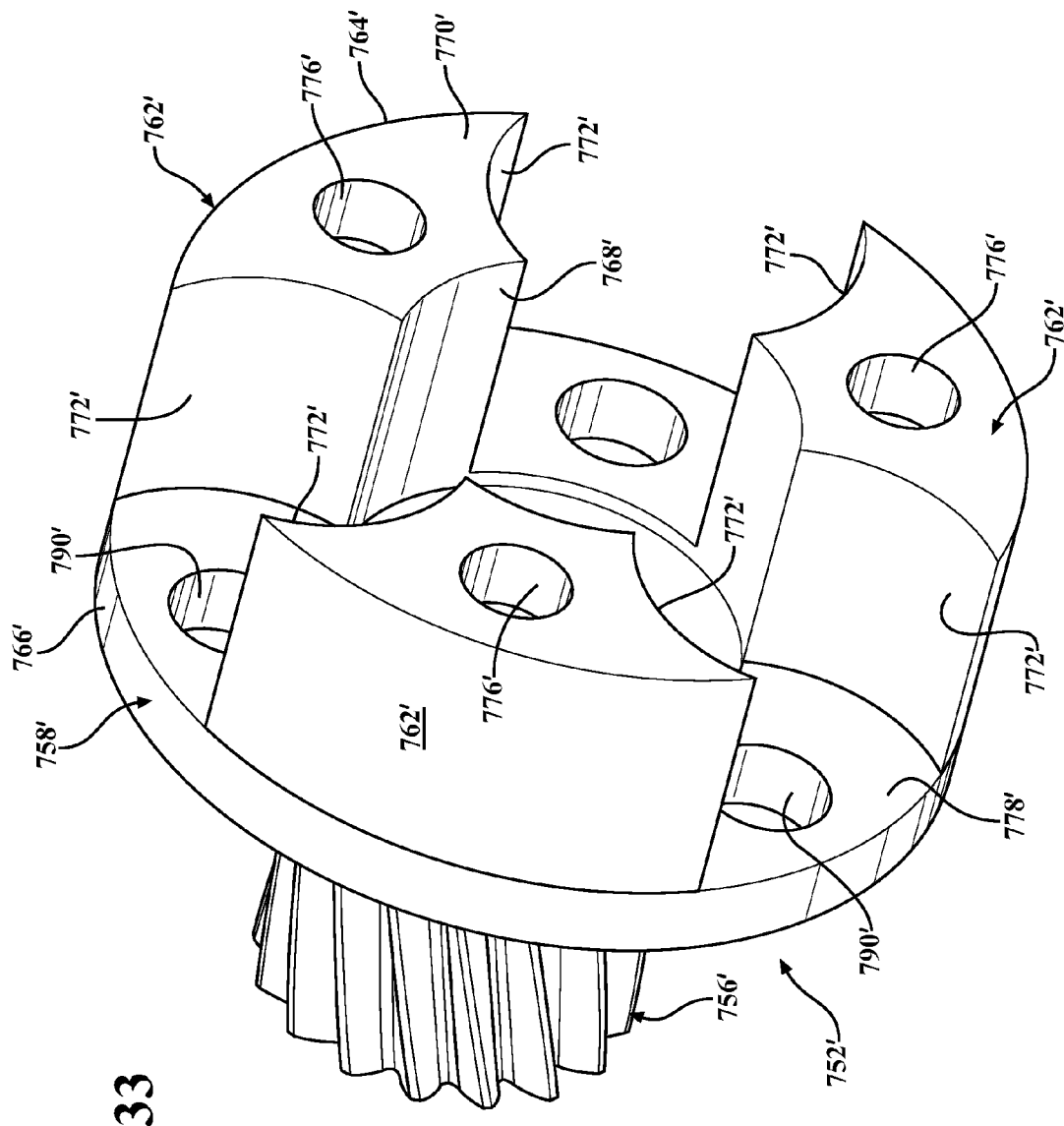

FIGS. 8, 8i and 8ii are sectional views of an electromechanical strut constructed in accordance with a fourth embodiment of the present disclosure and shown in a retracted position;

FIG. 9 is a perspective view of a telescoping unit associated with the electromechanical strut of FIG. 8, with an outer casing removed;

FIG. 10 is a perspective view of a power unit associated with the electromechanical strut of FIG. 8, with an outer casing removed from view;

FIG. 11 is an isolated perspective view of a tubular nut-shaft utilized in the telescoping unit of the electromechanical strut shown in FIG. 8;

FIG. 12 is an isolated perspective view of a stationary guide tube utilized in the telescoping unit of the electromechanical strut of FIG. 8;

FIG. 13 is a partially exploded fragmentary view of the interface between the telescoping and power units of the electromechanical strut of FIG. 8;

FIGS. 14 and 15 are perspective views of a motor-gearbox assembly constructed in accordance with the teachings of the present disclosure and which is adapted for installation in an electromechanical strut of the type generally shown in FIG. 8;

FIG. 16 is a side view of the motor-gearbox assembly shown in FIGS. 14 and 15;

FIGS. 17 and 18 are end views of the motor-gearbox assembly of FIG. 16;

FIG. 19 is a longitudinal sectional view of the motor-gearbox assembly taken generally along line 19-19 of FIG. 16 showing the components of the electric motor unit and the gearbox unit in more detail;

FIG. 20 is a partial sectional view of the gearbox unit of the motor-gearbox assembly taken generally along line 20-20 of FIG. 17 showing the components of a dual-stage planetary geartrain in more detail;

FIG. 21 is another partial sectional view of the gearbox unit taken generally along line 21-21 of FIG. 17;

FIG. 22 is another sectional view illustrating the dual-stage planetary geartrain associated with the gearbox unit of the motor-gearbox assembly;

FIG. 23 is an exploded perspective view of the motor-gearbox assembly illustrating a first stage gearset and a second stage gearset sharing a common ring gear integrated into a gearbox housing;

FIG. 24 is another exploded perspective view illustrating the second stage gearset and the gearbox housing in greater detail;

FIGS. 25 and 26 are exploded perspective views of the second stage gearset;

FIG. 27 is a sectional view of a gearbox unit configured for use with the motor-gearbox assembly of the present disclosure and illustrating the components of a dual-stage planetary geartrain constructed in accordance with an alternative embodiment;

FIG. 28 is an exploded perspective view of a two-piece planet carrier associated with the dual-stage planetary geartrain shown in FIG. 27;

FIG. 29 is an enlarged sectional view of the two-piece planet carrier shown in FIGS. 27 and 28;

FIG. 30 is an exploded perspective view of an alternative configuration for the two-piece planet carrier and which is adapted for use with the dual-stage planetary geartrain for installation in the gearbox unit shown in FIG. 27;

FIG. 31 is an assembled perspective view of the two-piece planet carrier shown in FIG. 30;

FIG. 32 is a sectional view of the assembled two-piece planet carrier taken generally along line 32-32 of FIG. 31;

FIG. 33 is a perspective view of the plate carrier member of the two-piece planet carrier shown in FIG. 30; and FIG. 34 is a perspective view of another two-piece planet carrier configured for use with the dual-stage planetary geartrain and gearbox unit of FIG. 20 that is manufactured using an over-molding process.

DETAILED DESCRIPTION

Vehicles, particularly passenger vehicles, are equipped with numerous moveable closure panels for providing openings and access within and through defined portions of the vehicle body. To enhance operator convenience, many vehicles are now equipped with power-operated closure systems to automatically control movement of all types of closure panels including, without limitation, hatch lift gates, trunk and hood deck lids, sliding and hinged doors, sun roofs and the like. The powered mechanical advantage is often provided by an electromechanical drive device including, without limitation, motor-driven gear drives, cable drives, chain drives, belt drives and power screw drives. Current development focus is largely directed to improving these popular systems through weight and part count reduction, packaging efficiency, system noise, back drive effort, cost and ease of assembly and service repair. Accordingly, the present disclosure addresses all of these issues.

For purposes of descriptive clarity, the present disclosure is described herein in the context of one or more specific vehicular applications, namely powered lift gate and deck lid systems. However, upon reading the following detailed description in conjunction with the appended drawings, it will be clear that the inventive concepts of the present disclosure can be applied to numerous other systems and applications. In this regard, the present disclosure is generally directed to electromechanical struts equipped with a power-operated drive mechanism comprised of a motor-gearbox assembly having an electric motor unit and a geared reduction unit driven by the electric motor unit, and a rotary-to-linear motion conversion assembly driven by the geared reduction unit. In addition, the present disclosure is directed to the geared reduction unit being equipped with a dual-stage planetary geartrain which advances the art and provides improvements over conventional geared reduction units. More specifically, the dual-stage planetary geartrain is configured to include a first stage planetary gearset and a second stage planetary gearset each associated with a common ring gear.

Referring now to FIG. 1, an embodiment of an electromechanical strut 10 is shown mounted to a motor vehicle. Electromechanical strut 10 includes a lower housing 12, an upper housing 14, and an extensible shaft 16. A first pivot mount 18, located at an end of lower housing 12, is pivotally mounted to a portion of the vehicle body that defines an interior cargo area in the vehicle. A second pivot mount 20 is attached to the distal end of extensible shaft 16 and is pivotally mounted to a lift gate 21 of the vehicle.

Referring now to FIG. 2, the interior of lower housing 12 is shown in greater detail. Lower housing 12 provides a cylindrical sidewall 22 defining a chamber 24. Pivot mount 18 is attached to an end wall 26 of lower housing 12 proximal to the vehicle body (not shown). Upper housing 14 provides a cylindrical sidewall 32 defining a chamber 34 that is open at both ends. A distal end wall 28 of lower housing 12 includes an aperture 30 so that chamber 24 and chamber 34 communicate with each other. Upper housing 14 has a smaller diameter than lower housing 12. However, it is contemplated that lower housing 12 and upper housing 14 can also be formed as a single cylinder or frusto-cone. Other form factors for lower housing 12 and upper housing 14 will occur to those of skill in the art. Upper housing 14 can be integrally formed with lower housing 12, or it can be secured to lower housing 12 through conventional means (threaded couplings, weld joints, etc.). A motor-gearbox assembly 36 is seated in chamber 24.

Motor-gearbox assembly 36 includes an electric motor 42, a slip clutch 44, and a geared reduction gearset 46 operable for driving a rotary drive member, such as a power screw 40 associated with a spindle-type drive mechanism. Motor 42 is mounted within chamber 24 near end wall 26. Motor 42 is secured to at least one of cylindrical sidewall 36 and end wall 26 to prevent undesired vibrations or rotation. Motor 42 may be a direct current bi-directional motor. Electrical power and directional control for motor 42 is provided via electrical cables that connect from the vehicle body through apertures (not shown) in end wall 26. Clutch 44 is connected to an output shaft of motor 42. Clutch 44 provides a selective engagement between the output shaft of motor 42 and a rotary input component of reduction gearset 46. Clutch 44 may be an electromechanical clutch that engages reduction gearset 46 when motor 42 is activated. When clutch 44 is engaged, torque is transferred from motor 42 to reduction gearset 46. When clutch 44 is disengaged, torque is not transferred between motor 42 and reduction gearset 46 so that no back drive occurs if, for example, lift gate 21 is closed manually. Clutch 44 may also be a passive torque-limiting friction clutch configured to disconnect motor 42 from reduction gearset 46 when manual operation of lift gate 21 occurs. As an optional arrangement, clutch 44 could be operably disposed between an output component of gearset 46 and power screw 40.

Reduction gearset 46 provides speed reduction and torque multiplication for power screw 40. Reduction gearset 46 is configured as a planetary gearset having a ring gear 50 driven by the output of clutch 44. In turn, a number of planet gears 52 transfer power from ring gear 50 to power screw 40 via an output gear 51, which is centrally disposed within planetary gearset 46, for providing the desired gear ratio reduction to power screw 40. Output gear 51 acts as a sun gear in planetary gearset 46. In the present embodiment, planetary gearset 46 provides about a 47:1 gear ratio reduction. Other gear ratio reductions will occur to those of skill in the art. Power screw 40 extends into upper housing 14. A coupling unit 53 interconnects output gear 51 of planetary gearset 46 to an input segment of power screw 40. Coupling unit 53 may provide for and accommodate misalignment between output gear 51 and power screw 40 while providing a damping feature to minimize shock loading. Coupling unit 53 and slip clutch 44 may be integrated into a common assembly to provide enhanced functionality and improved packaging efficiency.

Extensible shaft 16 has a cylindrical sidewall 54 defining a chamber 56 and is concentrically mounted between upper housing 14 and power screw 40. As described earlier, second pivot mount 20 is attached to the distal end of extensible shaft 16. The proximal end of extensible shaft 16 is open. A drive nut 58, also associated with the spindle-type drive mechanism, is mounted around the proximal end of extensible shaft 16 relative to lower housing 12 and is threadedly coupled with power screw 40 in order to convert the rotational movement of power screw 40 into the linear motion of extensible shaft 16 along the axis of power screw 40. The combination of threaded power screw 40 and threaded drive nut 58 defines the rotary-to-linear conversion device and, more particularly, the threaded spindle-type drive assembly. More specifically, internal threads formed in drive nut 58 are in threaded engagement with external threads formed on power screw 40. Drive nut 58 includes two external splines 60 that extend into opposing coaxial slots 62 formed on the inside of upper housing 14 to prevent drive nut 58 from rotating. The length of slots 62 defines the retracted and the extended positions of extensible shaft 16. Alternatively, a spindle drive assembly could be used in electromechanical strut 10 having an internally-threaded drive nut 58 driven by the output of planetary gearset 46 and threadedly meshed with an externally-threaded power screw 40 connected to extensible shaft 16. As a further alternative, a ballscrew drive assembly could be used in lieu of the spindle drive assembly without departing from the scope of the invention. An integrally-formed outer lip 64 in upper housing 14 provides an environmental seal between chamber 34 and the outside.

A spring housing 38 is provided in lower housing 12 and is defined by cylindrical sidewall 22, end wall 28, and a flange 66. Within spring housing 38, a power spring 68 is coiled around power screw 40, providing a mechanical counterbalance to the weight of lift gate 21. Preferably formed from a strip of steel, power spring 68 assists in raising lift gate 21 both in its powered and un-powered modes. One end of power spring 68 is attached to power screw 40 and the other is secured to a portion of cylindrical sidewall 22. When extensible shaft 16 is in its retracted position, power spring 68 is tightly coiled around power screw 40. As power screw 40 rotates to extend extensible shaft 16, power spring 68 uncoils, releasing its stored energy and transmitting an axial force through extensible shaft 16 to help raise lift gate 21. When power screw 40 subsequently rotates to retract extensible shaft 16, power spring 68 recharges by recoiling around power screw 40.

Power spring 68 stores sufficient energy when coiled to drive power screw 40 to fully raise lift gate 21, even when motor-gear assembly 36 is not engaged (typically by unlatching lift gate 21 to raise it manually.) In addition to assisting to drive power screw 40, power spring 68 provides a preloading force that reduces starting resistance and wear for motor 42. Furthermore, power spring 68 provides dampening assistance when lift gate 21 is closed. Unlike a gas strut, power spring 68 is generally not affected by temperature variations, nor does it unduly resist manual efforts to close lift gate 21. Although the present embodiment describes power spring 68 that uncoils to assist in raising lift gate 21 and recoils to lower lift gate 21, it has been contemplated that a power spring 68 could be provided that uncoils when lowering the lift gate and recoils when raising the lift gate.

Figure 4:
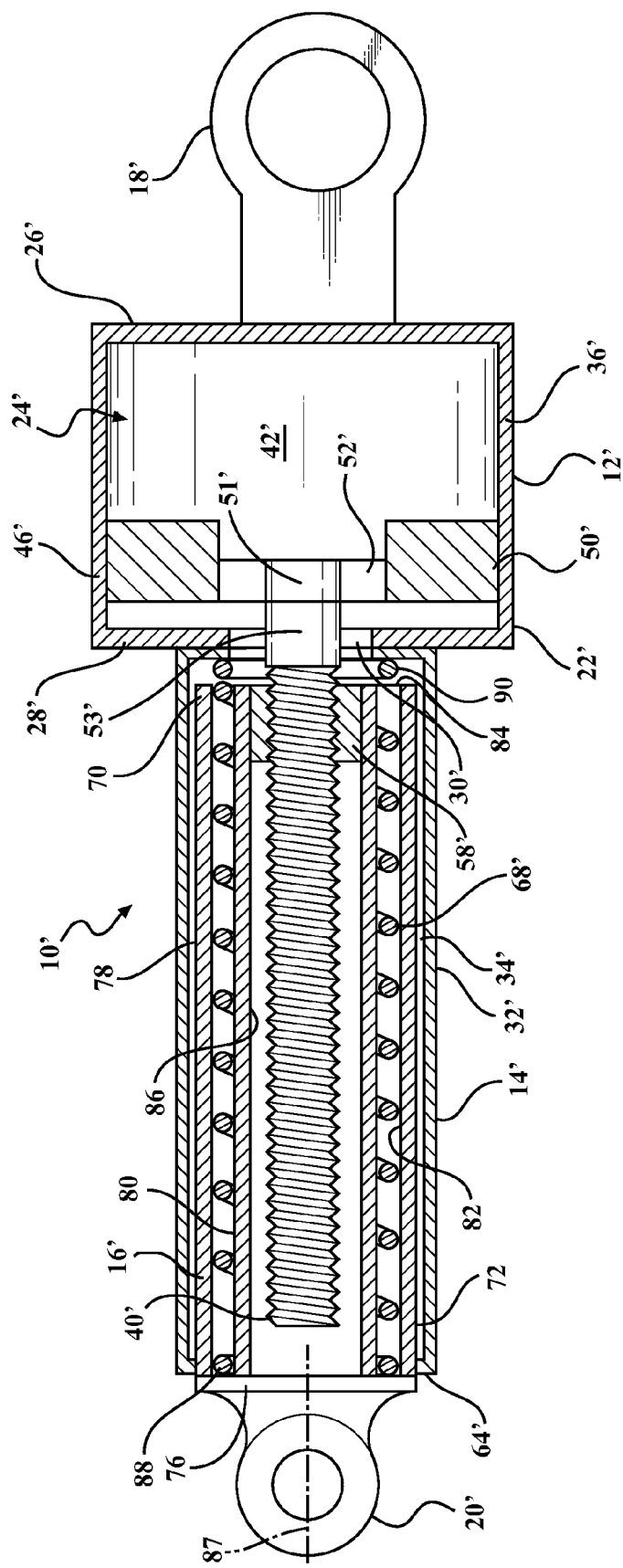
FIG. 4 is a sectional view of an electromechanical strut constructed in accordance with a second embodiment of the present disclosure and shown in a retracted position.
Figure 5:
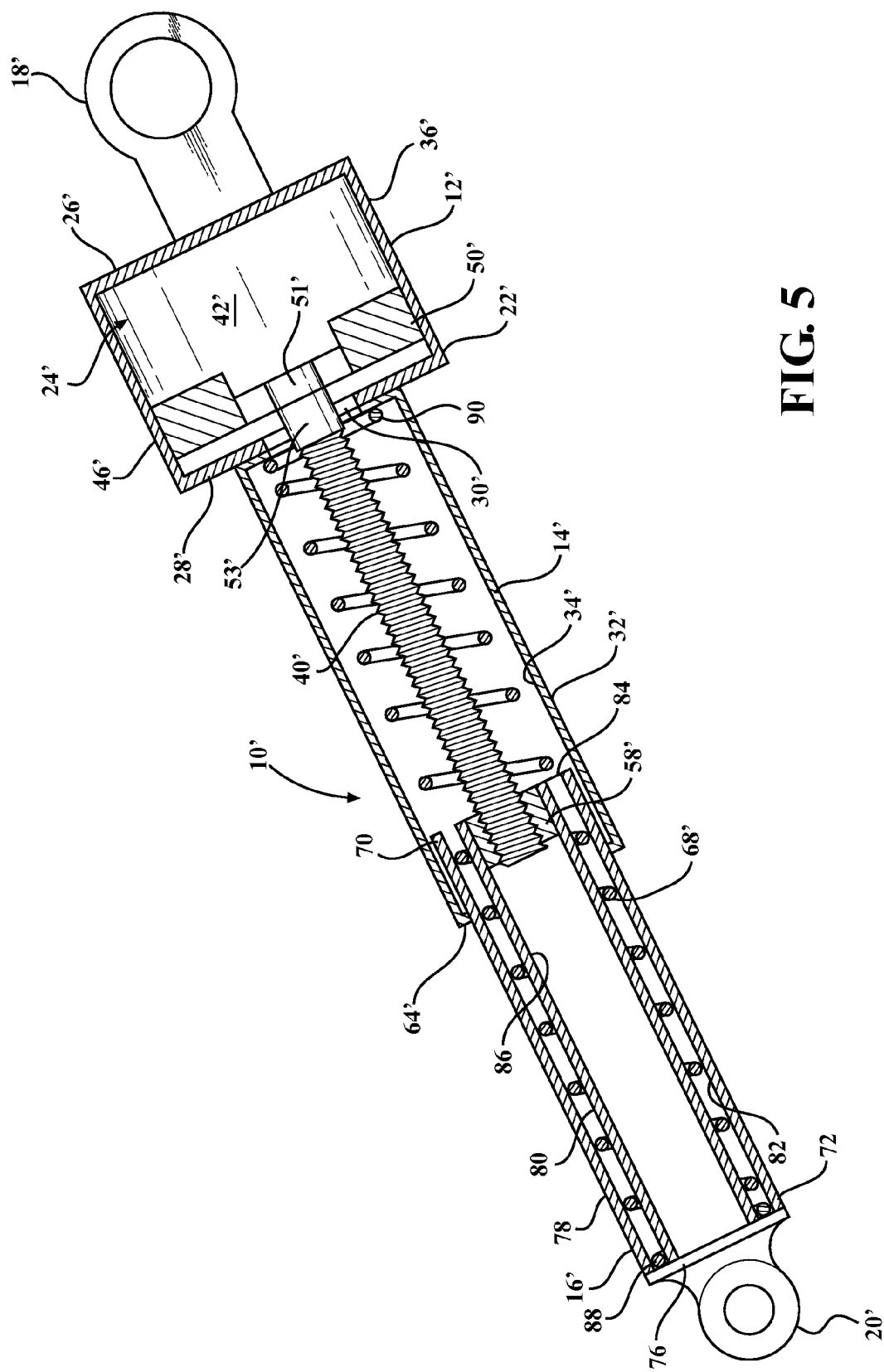
FIG. 5 is a sectional view of the electromechanical strut of FIG. 4 shown in an extended position.

Referring to FIGS. 4 and 5, wherein primed reference numerals represent similar elements as those set forth above, an electromechanical strut 10' constructed according to another embodiment is shown to include a lower housing 12' having a cylindrical sidewall 22' defining a chamber 24', and an upper housing 14' having cylindrical a sidewall 32' defining a chamber 34'. It is appreciated that lower 12' and upper 14' housings may be formed as a single housing.

Electromechanical strut 10' also includes an extensible shaft 16' movable between a retracted position, shown in FIG. 4, corresponding to a closed position of lift gate 21 and an extended position, shown in FIG. 5, corresponding to an open position of lift gate 21.

Motor-gearbox assembly 36' is seated within chamber 24'. Motor-gearbox assembly 36' includes electric motor unit 42' and a geared reduction gearset unit 46' for driving power screw 40'. Geared reduction unit 46' is a planetary gearset having planet gears 52' that transfer power from a ring gear 50' to a central output gear 51' for rotatably driving power screw 40' via a coupling unit 53'. In the current embodiment, planetary gearset 46' provides a 20:1 gear ratio reduction. In this arrangement, coupling unit 53' may act as an integrated flex coupling and slip clutch device, as will be detailed hereinafter.

Extensible shaft 16' extends between opposing first 70 and second 72 ends. First end 70 of extensible shaft 16' is open and second end 72 of extensible shaft 16' is closed off by an end wall 76. Second end 72 of extensible shaft 16' is connected to pivot mount 20'.

Extensible shaft 16' includes an outer cylindrical wall 78 and an inner cylindrical wall 80 spaced apart inwardly from outer cylindrical wall 78. One end of inner cylindrical wall 80 is connected to end wall 76. Outer cylindrical wall 78 and inner cylindrical wall 80 define a toroidal chamber 82 therebetween. One end of toroidal chamber 82 is closed off by end wall 76 and an opposing end of toroidal chamber 82 defines an opening 84. Inner cylindrical wall 80 further defines a cylindrical chamber 86 inward of toroidal chamber 82. Cylindrical chamber 86 is separated from toroidal chamber 82 by inner cylindrical wall 80.

Drive nut 58' is rigidly mounted in cylindrical chamber 86 of extensible shaft 16'. Drive nut 58' is threadedly coupled with power screw 40' in order to convert the rotational movement of power screw 40' into linear motion of extensible shaft 16' along a longitudinal axis 87 of power screw 40'. Power screw 40' and drive nut 58' define a threaded spindle drive assembly.

Power spring 68' is seated within toroidal chamber 82. Power spring 68' includes one end 88 engaging to second end 72 of extensible shaft 16', and another end 90 engaging to upper housing 14' adjacent lower housing 12'. Power spring 68' is a coil spring that uncoils and recoils as extensible shaft 16' moves relative to upper 14' and lower 12' housings. It is, however, appreciated that the particular type of spring may vary.

In powered operation, torque provided by motor 42' is transferred via planetary gearset 46' to power screw 40' for causing linear motion of extensible shaft 16', as described above. For manual operation, motor 42' and planetary gearset 46' can be back driven and/or coupling 53' can releasably disconnect power screw 40' from gearset 46'. The friction in the system due to the direct engagement of motor 42' and planetary gearset 46' with power screw 40' allows lift gate 21 to remain still in any intermediate position between the open and closed positions. Electromechanical strut 10' thus provides stable intermediate positions for the lift gate (useful, for example, for garages with low ceilings) without power consumption by using the internal friction of motor-gearbox assembly 36'.

Power spring 68' provides a mechanical counterbalance to the weight of lift gate 21. Power spring 68', which may be a coil spring, assists in raising lift gate 21 both in its powered and un-powered modes. When extensible shaft 16 is in the retracted position, power spring 68' is tightly compressed between extensible shaft 16' and lower housing 12'. As power screw 40' rotates to extend shaft 16', power spring 68' extends as well for releasing its stored energy and transmitting an axial force through shaft 16' to help raise lift gate 21. When power screw 40' rotates to retract extensible shaft 16', or when lift gate 21 is manually closed, power spring 68' is compressed between shaft 16' and lower housing 12' and thus recharges.

In addition to assisting in driving power screw 40', power spring 68' also provides a preloading force for reducing starting resistance and wear of motor 42'. Furthermore, power spring 68' provides dampening assistance when the lift gate 21 is closed. Unlike a gas strut, power spring 68' is generally not affected by temperature variations, nor does it unduly resist manual efforts to close the lift gate 21.

It is appreciated that a ball screw assembly, as known in the art, could be used in lieu of drive nut 58'. Also, although reference has been made specifically to lift gate 21, it is also appreciated that the invention may be applied to a variety of other closure panels such as trunks or deck lids.

Figure 6:
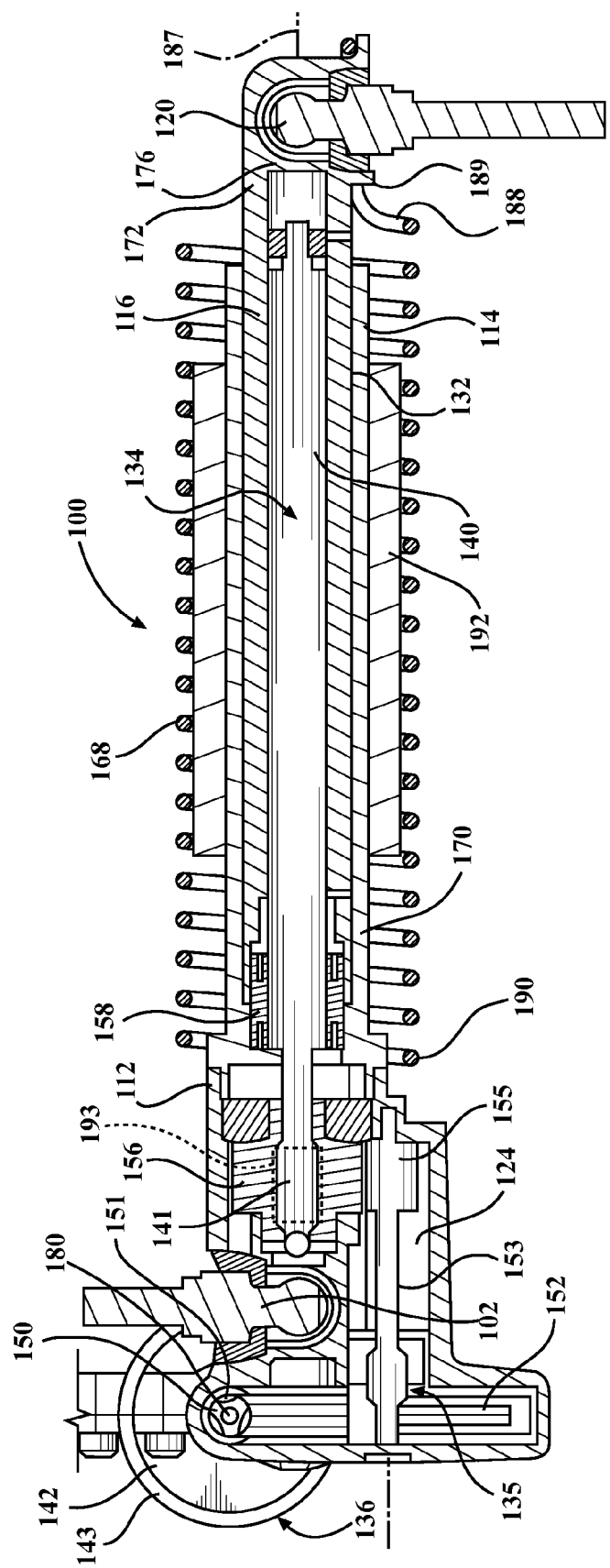
FIG. 6 is a sectional view of an electromechanical strut constructed in accordance with a third embodiment of the present disclosure and shown in a retracted position.

FIG. 6 shows another embodiment of an electromechanical strut 100, which is particularly suited for smaller closure panels such as a trunk deck lid as opposed to larger closure panels such as lift gates, because electromechanical strut 100 has a shorter overall length as compared to the previously discussed embodiments. Electromechanical strut 100 includes a lower housing 112 defining a gearbox housing 124, and an upper housing 114 having a cylindrical sidewall 132 defining a chamber 134. A mount 102 is connected to lower housing 112. The lower 112 and upper 114 housings may be formed as a single housing. Electromechanical strut 100 also includes an extensible shaft 116 movable between a retracted position, shown in FIG. 6 corresponding to a closed position of the deck lid, and an extended position, shown in FIG. 7A corresponding to an open position of the deck lid.

A motor-gearbox assembly 135, including a motor unit 142 and a geared reduction unit 136, drives a power screw 140 which, in turn, drives extensible shaft 116 as is discussed in greater detail below. In this particular embodiment, motor 142 is an electric motor mounted in a housing 143 while geared reduction 136 is a two-stage geartrain 136. More particularly, motor 142 features an output shaft 150 with a worm 151 fixedly mounted thereon that extends into gearbox housing 124. Worm 151 drivingly engages a worm gear 152 mounted in gearbox housing 124. Worm 151 and worm gear 152 define a worm gearset. Worm gear 152, in turn, includes an integral or rigidly mounted shaft 153 extending transversely from worm gear 152 along its rotational axis, thus providing a first stage speed reduction and torque multiplication. Shaft 153 is journalled in gearbox housing 124 and features a pinion gear 155 that drivingly engages a drive gear 156, thus providing a second stage of speed reduction and torque multiplication. In the present embodiment, two-stage geartrain 136 provides about a 38:1 gear ratio reduction, although this ratio will vary depending on the specific geometry of any particular application. Power screw 140 has a non-threaded butt 141 that extends into and is fixedly connected in a central aperture of drive gear 156, thus transferring rotary power from motor 142 to power screw 140. In the foregoing manner, motor 142 may be mounted with its longitudinal axis 180 which is centered along motor output shaft/worm 150, 152, transverse to a longitudinal axis 187 of upper housing 114, which is centered along power screw 140. Hence, the overall length of the electromechanical strut 100 may be reduced compared to the previously described embodiments 10, 10' of the strut.

Extensible shaft 116 extends between opposing first 170 and second 172 ends. First end 170 of extensible shaft 116 is open and second end 172 of extensible shaft 116 is closed off by an end wall 176. Second end 172 of extensible shaft 116 is connected to a mount 120. A drive nut 158 is rigidly mounted in extensible shaft 116 at first end 170 thereof. Drive nut 158 is threadedly coupled to power screw 140 in order to convert the rotational movement of power screw 140 into linear motion of the extensible shaft 116 along longitudinal axis 187 of power screw 140. Thus, power screw 140 and drive nut 158 define a threaded spindle drive assembly.

In the present embodiment, a power spring 168 is fitted over cylindrical sidewall 132. A first end 188 of spring 168 abuts or is otherwise connected to a lip 189 proximate second end 172 of extensible shaft 116. A second end 190 of spring 168 abuts or is otherwise connected to upper housing 114 adjacent lower housing 112. The spring 168 is a coil spring that uncoils and recoils as the extensible shaft 116 moves relative to upper 114 and lower 112 housings. In the mounting position shown in FIG. 7A, spring 168 is in compression and is biased to urge extensible shaft 116 toward the extended position corresponding to the open position of the deck lid. In this embodiment, mount 120 is connected to a goose neck hinge 121 that pivots the deck lid (not shown) with mount 102 is connected to the vehicle body. A foam dampener 192 (FIG. 6) is concentrically installed between the coils of spring 168 and cylindrical sidewall 132 to inhibit collapse of the coils and the minimize gear noise.

In powered operation, torque provided by electric motor 142 is transferred via two-stage geartrain 136 to power screw 140, causing linear motion of extensible shaft 116 as described above. For manual operation, because there is no clutch, the motor 142 and geartrain 136 must be back driven. As an alternative to the direct connection between drive gear 156 and butt portion 141 of power screw 140, a coupling unit 193, shown in phantom in FIG. 6, can be installed therebetween to provide at least one of a torque-limiting (i.e. slip clutch) function and a torsional/axial damping (i.e. flex damper) function. In this regard, various embodiments of such an integrated coupling unit will be described hereinafter.

Power spring 168 provides a mechanical counterbalance to the weight of the deck lid. Spring 168, which may be a coil spring, assists in raising the deck lid both in its powered and un-powered modes. When extensible shaft 116 is in the retracted position, power spring 168 is tightly compressed between extensible shaft 116 and lower housing 112. As power screw 140 rotates to extend shaft 116, power spring 168 extends as well, releasing its stored energy and transmitting an axial force through shaft 116 to help raise the deck lid. When power screw 140 rotates to retract extensible shaft 116, or when the deck lid is manually closed, power spring 168 is compressed between shaft 116 and lower housing 112 and thus recharges.

Figure 7B:
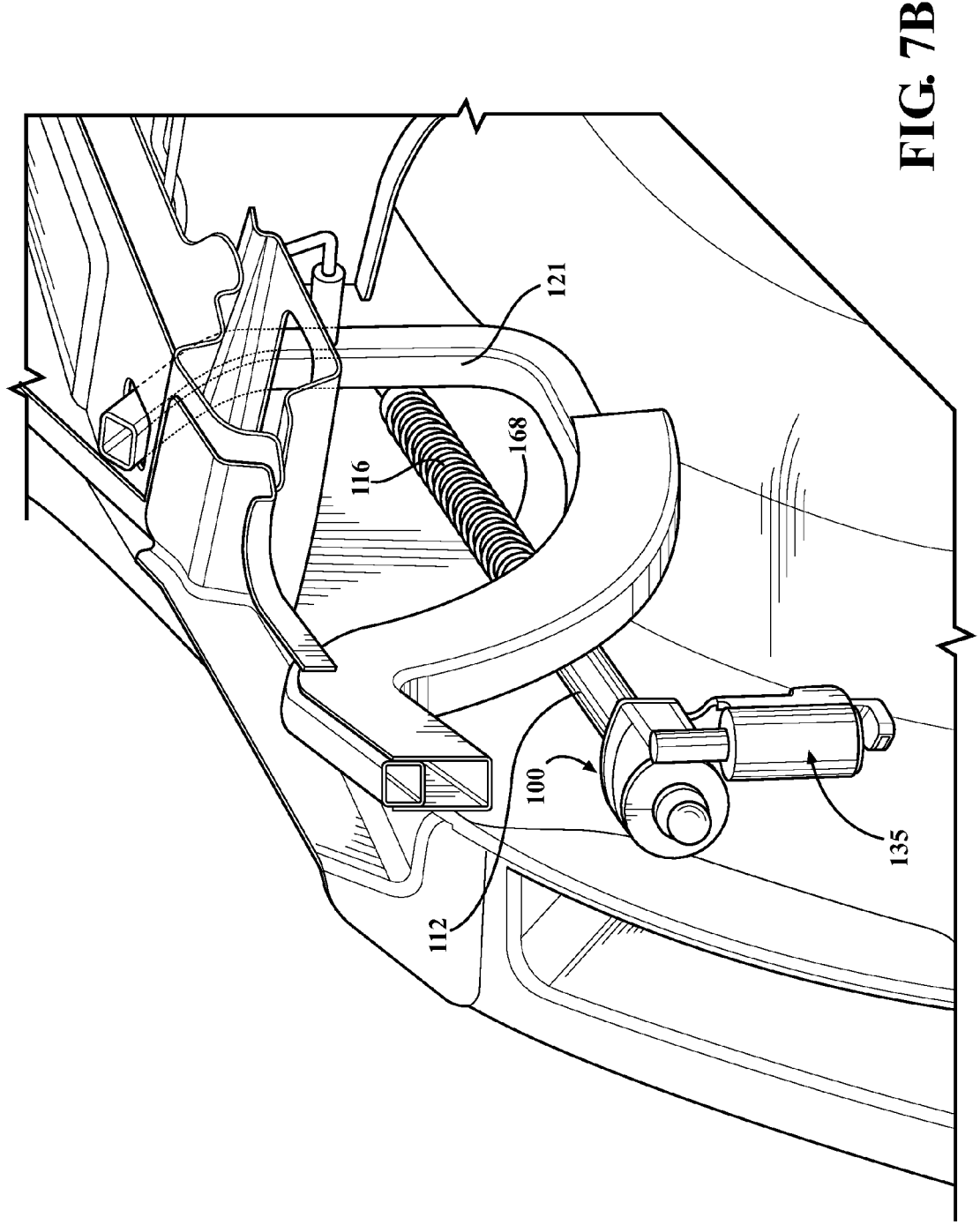

In FIG. 7B, spring 168 is in compression and is biased to urge extensible shaft 116 toward the extended position corresponding to the open position of the deck lid. In the mounting position shown in FIG. 7B, extensible shaft 116 is in its fully extended position when the deck lid is closed and extensible shaft 116 transitions to its fully retracted position when the deck lid is opened. In this mounting position, spring 168 is in tension and is biased to urge extensible shaft 116 toward the retracted position corresponding to the open position of the deck lid.

FIGS. 8, 8i, and 8ii show a cross-sectional view of another embodiment of an electromechanical strut 200 that has a more modular design than the previously discussed embodiments 10, 10' of the strut. Electromechanical strut 200 comprises two main, separable, units: a power drive unit 202 and a telescoping unit 204, which are shown in isolation in the fragmentary axonometric views of FIG. 9 and FIG. 10 (with covering walls removed). Power drive unit 202 is sized and rated to function as a drive unit for a variety of closure panels associated with different vehicles. Telescoping unit 204 may be sized as required for each unique vehicle model to achieve a desired telescoping travel length. Power drive unit 202 features an output drive shaft 206 and an elastomeric coupling 208 that enable power unit 202 to be quickly and easily attached with telescoping unit 204 as discussed in greater detail below. As seen in FIGS. 8i and 8ii, an elongate tubular cover 210 preferably manufactured from plastic is fitted over the power and telescoping units 202, 204 to cover the joint between the two units from the environment. Cover 210 also provides an aesthetically pleasing uniform appearance of the strut to the observer.

As best shown in FIG. 8ii, power unit 202 has a tubular casing 212 fixed to an end cap 220 to define a chamber 224. The end cap includes a pivot mount 221. A portion of a motor-gearbox assembly 236 is seated within chamber 224. Motor-gearbox assembly 236 includes an electric motor 242 and a planetary reduction gearset 246 operable to drive a power screw 240. Motor 242 and planetary reduction gearset 246 are installed within respective motor and gearbox housings which, in turn, are seated within chamber 224. Power screw 240 is seated in telescoping unit 204 and couples to power unit output shaft 206, as discussed in greater detail below. In the illustrated embodiment, planetary reduction gearset 246, which is known in the art per se, provides about a 20:1 gear ratio reduction.

As best shown in FIG. 8i, telescoping unit 204 has an extensible member 216 which comprises an outer guide tube or tubular casing 214 and a tubular nut-shaft 281, which are rigidly fixed to one another via an end cap 218. Extensible member 216 is movable between a retracted position, shown in FIG. 8 corresponding to a closed position of lift gate 21, and an extended position, not shown corresponding to an open position of the lift gate 21.

Outer tubular casing 214 includes a cylindrical wall 278 that extends between opposing first 270 and second 272 ends and defines a chamber 234. First end 270 of cylindrical wall 278 is open and the second end 272 of cylindrical wall 278 is closed off by end cap 218. Preferably, second end 272 of cylindrical wall 278 is secured to end cap 218 via a snap ring 273. End cap 218 includes a pivot mount 221.

Tubular nut-shaft 281 features a cylindrical wall 280 spaced apart inwardly from cylindrical wall 278 of outer tubular casing 214. One end of cylindrical wall 280 is rigidly connected to end cap 218. Cylindrical wall 278 of outer tubular casing 214 and cylindrical wall 280 of tubular nut-shaft 281 define a toroidal chamber 282 therebetween. One end of toroidal chamber 282 is closed off by end cap 218 and an opposing end of toroidal chamber 282 defines an opening 284. Cylindrical wall 280 of tubular nut-shaft 281 further defines a cylindrical chamber 286 inward of toroidal chamber 282. Cylindrical chamber 286 is separated from toroidal chamber 282 by cylindrical wall 280.

In the present embodiment, cylindrical wall 280 of tubular nut-shaft 281 and end cap 218 have mating helical threads 283 for interconnecting the parts. As seen best in the isolated view of FIG. 11, to prevent the loosening or unscrewing of tubular nut-shaft 281 from end cap 218, a pin (not shown) is installed along a through hole 285 in end cap 218 that is aligned with cylindrical wall 280. In this manner the pin does not unduly pierce the cylindrical chamber 286, enabling the full volume of cylindrical chamber 286 to be used.

A drive nut 258 (FIG. 8ii) is rigidly mounted in cylindrical chamber 286 of tubular nut-shaft 281 proximate opening 284 thereof. In the preferred embodiment, drive nut 258 is riveted into cylindrical wall 280. Drive nut 258 is threadedly coupled with power screw 240 in order to convert the rotational movement of power screw 240 into linear motion of extensible member 216 along a longitudinal axis 287 of power screw 240.

In the present embodiment, telescoping unit 204 includes an elongated, stationary inner guide tube 260 having an open end 262 distal to power unit 202 and an opposing end 264 proximate to and fixedly connected to power unit 202. Stationary guide tube 260 can be considered to form part of the housing connecting one end of the strut to the lift gate (or vehicle body), with the extensible member 216 connecting the other end of the strut the vehicle body (or lift gate). Stationary inner guide tube 260 is disposed in toroidal chamber 282 immediately adjacent to cylindrical wall 280 of tubular nut-shaft 281 and spaced apart inwardly from cylindrical wall 278 of outer guide tube/tubular casing 214. Stationary inner guide tube 260 fits closely over tubular nut-shaft 281 but does not extend or translate linearly with the extensible member 216.

A power spring 268 is seated within toroidal chamber 282, between stationary inner guide tube 260 and cylindrical wall 278 of outer guide tube/tubular casing 214. Power spring 268 is a coil spring that uncoils and recoils as extensible member 216 moves relative to stationary tube 260 and power unit 202. The annular spacing between stationary inner guide tube 260 and outer guide tube/tubular casing 214 is sized to closely fit the preferred toroidal form of power spring 268. One end 288 of spring 268 is connected to end cap 218 of extensible member 216 and another end 290 of spring 268 is connected to end 264 of stationary inner guide tube 260 proximate to, and ultimately supported by, power unit 202. It should be appreciated that in the present embodiment, power spring 268 is guided and supported against buckling along its entire length of travel by the combined action of stationary inner guide tube 260 which guides the inside edge of power spring 268, and outer guide tube/tubular casing 214 which guides the outer edge of power spring 268. In the preferred embodiment, when extensible member 216 is at its fully extended position, stationary inner guide tube 260 and outer guide tube/tubular casing 214 overlap or are co-extensive thus inhibiting the tendency of power spring 268 to buckle.

Power spring 268 may be composed of first and second coil segments 268A, 268B that are serially arranged in toroidal chamber 282. The first coil segment is wound a first direction, and the second coil segment is wound in the opposite direction. A thrust bearing, such as washer 266, is interposed between the first and second coil segments 268A, 268B. This arrangement is advantageous because it balances torsional loads that coil segments 268A, 268B encounter as extensible member 216 translates. In contrast, when only one spring is present, as the extensible member moves a torsional force develops at the ends of the spring that will typically cause the spring to rotate, resulting in a high frictional force due to the contact between the many coils in the spring and the outer and inner guide tubes 214, 260. Thus, the preferred embodiment decreases the friction between power spring 268 and outer and inner guide tubes 214, 260, increasing the efficiency of the system and reducing manual opening and closing efforts of the lift gate. It should be appreciated, however, that the particular type of spring may vary.

Telescoping unit 204 mounts on the power unit 202 as follows: Referring additionally to the fragmentary exploded views of FIGS. 12 and 13, elastomeric coupling 208 of power unit 202 is pre-bolted onto its tubular casing 212 via screw holes 222. Elastomeric coupling 208 features a plurality of elastomeric coupling lugs 226 (FIG. 10). Stationary inner guide tube 260 includes a tubular bearing housing 292 (FIG. 12). In the preferred embodiment, for ease of manufacture, tubular bearing housing 292 is a separate piece that is fixedly mounted is fixedly mounted to the end 264 of tube 260. More particularly, tube 260 (or portions thereof) is flared outwardly, as may be readily accomplished in a crimping or punching operation, to create a circlip 294 against the inner wall of the tubular bearing housing 292. Bearing housing 292 also features a plurality of lugs 296 that interdigitatingly mate with lugs 226 of elastomeric coupling 208. In alternative embodiments, stationary guide tube 260 and bearing housing 292 can be formed from one piece.

A tubular gearset coupler 238 is journalled within bearing housing 292 via ball bearings 228 (FIG. 8ii). A spacer sleeve 230 mounted over coupler 238 and an internal circlip 232 retain the ball bearings 228 within housing 292. Coupler 238 is elongated with one end of coupler 238 drivingly mating with a butt end 241 of power screw 240. Preferably, a pin 256 fixes spacer sleeve 230 and coupler 238 to the power screw 240. The other end of coupler 238 mates with the power unit output drive shaft 206. As an alternative to the direct connection between drive gear 156 and butt portion 241 of power screw 240, a coupling unit 293, shown in phantom, can be installed there between to provide at lease one of a torque-limiting (i.e. slip clutch) function and a torsional/axial damping (i.e. flex damper) function. In this regard, various embodiments of such an integrated coupling unit will be described hereinafter.

Thus, telescoping unit 204 may be quickly and easily attached to power unit 202 by simply slipping coupler 238 over power unit output drive shaft 206 whilst interdigitating lugs 296, 226 of bearing housing 292 and flexible coupling 208. Bearing housing 292 is then preferably fixedly mounted to tubular casing 212 of the power unit 202 via screw holes 298. It should be appreciated that flexible coupling 208 eliminates the need for very precise alignment of power screw 240 with the gearset 246, reducing the need for high precision parts, whilst tolerating a rigid connection between the power screw 240 and planetary gearset 246.

Referring still to FIGS. 8i, 8ii, and 10, power unit 202 may include additional elastomeric spacers or bumpers. More particularly, an elastomeric spacer 244 (FIG. 8ii) is installed within casing 212 between motor 242 and gearset 246. Another bumper 248 (FIG. 8ii) is installed within casing 212 at the rear end of the motor 242. Elastomeric bumper 248, spacer 244, and coupler 208 preferably have respective hardnesses of 40, 60 and 80 Durometer Shore A. These elastomeric components isolate motor 242 and gearset 246 from tubular casing 212, dampening the noise and vibration of the system, particularly if the hardness of each elastomeric component is selected to dampen the major harmonic vibrations of the system. In addition, the elastomeric components, particularly coupling 208, enable electromechanical strut 200 to have a "soft start" upon power up, which will tend to increase system durability. In particular, absent extra circuitry, when motor 242 starts up it will tend to have a high starting moment. As strut 200 is prohibited from rotating due to its connection with the vehicle body and lift gate, this high starting moment will be transferred from power unit 202 onto telescoping unit 204. However, elastomeric coupling 208 will reduce the initial impact on the components and hence reduce the wear and tear on the system. In alternative embodiments, elastomeric coupling 208 can be mounted to bearing housing 292 and/or the casing of the power unit 202 may have interdigitating lugs.

In powered operation, torque provided by motor 242 is transferred via gearset 246 to power screw 240 for causing linear motion of extensible member 216 as described above. For manual operation, motor 242 and planetary gearset 246 are back driven. The friction in the system due to the direct engagement of motor 242 and planetary gearset 246 with power screw 240 allows the lift gate 21 to remain still in any intermediate position between the open and closed positions. Electromechanical strut 200 thus provides stable intermediate positions for the lift gate 21 (useful, for example, for garages with low ceilings) without power consumption by using the internal friction of motor-gearbox assembly 236.

Power spring 268 provides a mechanical counterbalance to the weight of lift gate 21. Power spring 268 may comprise two serially arranged coil spring segments which assist in raising the lift gate both in its powered and un-powered modes. When extensible member 216 is in the retracted position, power spring 268 is tightly compressed between end cap 218 of extensible member 216 and bearing housing 292 which is supported by tubular casing 212 of power unit 202. As power screw 240 rotates to extend extensible member 216, power spring 268 extends as well, releasing its stored energy and transmitting an axial force through extensible member 216 to help raise lift gate 21. When power screw 240 rotates to retract extensible member 216, or when lift gate 21 is manually closed, power spring 268 is compressed between end cap 218 and the bearing housing 292 and thus recharges.

It is appreciated that a ball screw assembly, as known in the art, could be used in lieu of drive nut 258. Also, although reference has been made specifically to a lift gate, it is also appreciated that the invention may be applied to a variety of other closure panels such as trunks or deck lids.

Referring now to FIGS. 14-26, an embodiment of a motor-gearbox assembly 600 constructed in accordance with the present disclosure is illustrated. While not limited thereto, motor-gearbox assembly 600 is adapted for use with inline electromechanical struts, such as electromechanical struts 10, 10' of FIGS. 1-5 and electromechanical strut 200 of FIGS. 8-13. For purposes of clarity, motor-gearbox assembly 600 will now be described in conjunction with the modular version of electromechanical strut 200. Accordingly, motor-gearbox assembly 600 is adapted to be associated with power drive unit 202 and be installed within chamber 224 formed in tubular casing 212. Motor-gearbox assembly 600 is generally a two unit assembly configured to integrate an electric motor unit 602 and a gearbox unit 604 into a common assembly. Electric motor unit 602 includes a cylindrical motor housing 606 defining an internal motor chamber 608 within which a stator assembly (not shown) and a rotor shaft 610 are operably disposed. Rotor shaft 610 is supported for rotation about the central axis of motor-gearbox assembly 600 via a pair of laterally-spaced bearing rings 612 and 614. A plurality of electrical connectors 616 extend through an endplate 618 that is rigidly secured to motor housing 606 to provide electrical power to the stator assembly. Rotor shaft 610 defines a rotary motor output component 620 which extends through an aperture 624 formed through a cup-shaped end segment 622 of motor housing 606. As seen, bearing ring 614 is installed within aperture 624. Aperture 624 extends through an annular boss segment 626 extending axially and outwardly from end segment 622 of motor housing 606. As will be detailed, motor output component 620 is arranged to drive a rotary input component of a dual-stage planetary geartrain 630 associated with gearbox unit 604.

Gearbox unit 604 is shown to include a gearbox housing 632 having a cylindrical drum segment 633 and a cup-shaped end segment 634. A cover ring 636 is secured to cup-shaped end segment 622 of motor housing 606 via a plurality of fasteners, such as screws 638. Cover ring 636 is configured to include an outer annular flange section 640 that is sized for receipt and retention within a recessed end portion 642 associated with drum segment 633 of gearbox housing 632. A releaseable connector, such as a twist-lock arrangement, is provided between flange section 640 of cover ring 636 and end portion 642 of drum segment 633 for releaseably securing gearbox housing 632 to motor housing 606. Cover ring 636 also includes a central aperture 644 surrounding boss segment 626 of motor housing 606 and through which motor output component 620 extends into an internal gearbox chamber 646 defined within gearbox housing 632. Cover ring 626 is formed of suitably rigid material selected to dampen vibration and act as an isolator between motor unit 602 and gearbox unit 604. As best seen in FIG. 15, cup-shaped end segment 634 of gearbox housing 632 defines a tubular boss 650 and a series of circumferentially-aligned lugs 652 surrounding boss 650. Lugs 652 are provided for simply and accurately attaching power drive unit 202 equipped with motor-gearbox assembly 600 to telescopic unit 204 via flexible coupling 208 in a manner similar to that described in detail for electromechanical strut 200 and as shown in FIGS. 8-13.

Dual-stage planetary geartrain 630 is installed within gearbox chamber 646 and generally includes a first stage gearset 660 and a second stage gearset 662 cooperatively associated with a uniform or "common" ring gear 664 that is integrally formed in, or rigidly secured to, an inner surface of cylindrical drum segment 633 of gearbox housing 632. More specifically, first stage gearset 660 includes a first sun gear 670 coupled for common rotation with motor output component 620, a first planet carrier 672 having a plurality of circumferentially-aligned and axially-extending first pins 674, and a plurality of first satellite or planet gears 676 each being rotatably supported on a corresponding one of the plurality of first pins 674. First pins 674 can be formed integrally with, or rigidly secured to, first planet carrier 672. In the particular non-limiting example shown, a plurality of three (3) first planet gears 676 are provided in association with first stage gearset 660. Each of the plurality of first planet gears 676 is in constant mesh with first sun gear 670 and a first ring gear segment 678 of common ring gear 664. In accordance with a preferred construction, each of first sun gear 670, first planet gears 676 and first ring gear segment 678 of common ring gear 664 are formed with helical gear teeth. To accommodate axially-directed thrust loads generated by the helical gearing, first planet gears 676 are located between a planar thrust face surface 680 of first planet carrier 672 and a thrust ring 682 engaging a planar thrust face surface 684 of cover ring 636. First planet carrier 672 is shown to include a recessed face surface 686 offset from thrust face surface 680 and aligned with first sun gear 670.

Second stage gearset 662 includes a second sun gear 690 driven by first planet carrier 672, a second planet carrier 692 having a plurality of circumferentially-aligned and axially-extending second pins 694, and a plurality of second satellite or planet gears 696 each being rotatably supported on a corresponding one of the plurality of second pins 694. Second sun gear 690 can be formed integrally with, or rigidly secured to, first planet carrier 672. Likewise, second pins 694 can be formed integrally with, or rigidly secured to, second planet carrier 692. In accordance with the non-limiting example shown, a plurality of four (4) second planet gears 696 are provided in association with second stage gearset 662. Each second planet gear 696 is in constant mesh with second sun gear 690 and a second ring gear segment 698 of common ring gear 664. In accordance with a preferred construction, each of second sun gear 690, second planet gears 696 and second ring gear segment 698 of common ring gear 664 are formed with helical gears. To accommodate axial thrust loads, each second planet gear 696 is mounted on one of second pins 694 extending between first and second carrier ring segments 700, 702 of second planet carrier 692 and which provide planar thrust surfaces. First and second carrier ring segments 700, 702 are best shown in FIG. 24 to be interconnected by web segments 704 extending between window apertures 706 through which a portion of second planet gears 696 rotatably extend.

Second sun gear 690 is shown in FIG. 22 to be securely fastened via a suitable fastener, such as a threaded screw 710, for common rotation with first planet carrier 672. However, as mentioned, second sun gear 690 can be formed integrally with first planet carrier 672 in alternative configurations. A rotary output component 712 of dual-stage planetary geartrain 630 drivingly coupled for rotation with second carrier ring segment 702 of second planet carrier 692. More specifically, second planet carrier 692 includes a tubular stub shaft segment 714 formed integrally with, or rigidly secured to, second carrier ring segment 702. Stub shaft segment 714 is configured to be rotatably disposed within boss 650 of gearbox housing 632. Output component 712 is shown to be an externally-lugged gearbox output shaft 716 having a first portion retained in a central aperture 718 formed in stub shaft segment 714 of second planet carrier 692. A suitable fastener, such as threaded screw 720, can be used to secure the first portion of gearbox output shaft 716 to second planet carrier 692 alone or in combination with meshing lugs (not shown) formed in aperture 718. A thrust ring 722 is aligned in proximity to a terminal end 724 of stub shaft segment 714 and engages a terminal end surface 726 of boss 650. Thrust ring 722 is axially retained via a retainer clip 728 installed in a mounting grove 730 formed in a second portion of gearbox output shaft 716. The second portion of gearbox output shaft 716 is adapted to be drivingly connected to the input of a clutch/coupling assembly, either directly or via an intermediate coupler device. In those applications without a clutch/coupling device, gearbox output shaft 716 can be directly coupled to an input segment of the power screw.

Based on the arrangement disclosed, first stage gearset 660 is configured to provide a first speed reduction between motor output component 620 and first planet carrier 672. Thus, first sun gear 670 acts as the input component of first stage gearset 660, first planet carrier 672 acts as its output component, while first ring gear segment 678 acts as its reaction component. Furthermore, second stage gearset 662 is configured to provide a second speed reduction between first planet carrier 672 and second planet carrier 692. Specifically, since second sun gear 690 drivingly coupled for rotation with first planet carrier 672, it acts as the input component for second stage gearset 662. Likewise, since gearbox output shaft 716 is fixed for rotation with second planet carrier 692, it acts as the output component of second stage gearset 662 while second ring gear segment 698 acts as its reaction component. Thus, a dual-stage reduction ratio drive connection is established between motor output component 620 and gearbox output component 716.

In accordance with one preferred construction for dual-stage planetary geartrain 630 it is contemplated that first ring gear segment 678 and second ring gear segment 698 of common ring gear 664 have the identical diameter and tooth pattern for providing commonality between both of first stage gearset 660 and second stage gearset 662, thereby permitting simplified manufacture, reduced noise and optimized alignment of the geared components within gearbox housing 632. In addition, the use of commonly-aligned and sized first pins 674 and second pins 694, in combination with uniform first and second ring gear segments of ring gear 664, permits use of the same satellite (planet) gears and similarly-sized sun gears for first stage gearset 660 and second stage gearset 662. The tooth pattern of common ring gear 664 is shown to be a continuous helical gear tooth pattern associated with first ring gear segment 678 and second ring gear segment 698. As such, helical gear teeth are also formed on the first and second planet gears as well as the first and second sun gears. However, the present disclosure is intended to also include the optional use of straight toothed (i.e. spur gear) gear components for dual-stage planetary geartrain 630.

To reduce weight, it is contemplated that first planet carrier 672 and/or second planet carrier 692 can be formed from rigid plastic materials or lightweight metal, such as aluminum. Likewise, gearbox housing 632 and its integrally-formed common ring gear 664 can also be made from plastic. Gearbox housing 632 preferably has a common outer diameter along its entire length. It is also contemplated that equal numbers of first and second planet gears may be used for dual-stage planetary geartrain 630, that common planet carriers may be used, and that single ring-type carriers (e.g. carrier 672) or dual ring-type carriers (e.g. carrier 692) can be used. Furthermore, different materials for the planet carriers and/or the pins can be used to accommodate torque requirements such as, for example, plastic components associated with first stage gearset 660 and metal components associated with second stage gearset 662. The use of such components permits a modular design approach and accommodate varying strength requirements while maintaining common gear component sizes for interchangeability.

While gearbox unit 604 has been shown associated with a specific motor unit 602, it is to be understood that any type of electric motor having a rotary output can be used in combination with gearbox unit 604. More specifically, gearbox unit 604 is adapted to be installed with any suitable electric motor unit to define motor-gearbox assembly 600. As such, the specific construction and type of the electric motor is not limiting provided it has a rotary output component capable of being coupled to the input of dual-stage planetary geartrain 630. Furthermore, the designation of first and second ring gear segments of common ring gear 664 is not intended to infer that different helical gear tooth profiles/configurations are required since this disclosure relates to a common ring gear 664 having a continuous helical gear tooth pattern.

In a preferred arrangement, the combination of teeth number associated with common ring gear 664 and first sun gear 670 and second sun gear 690 are selected to permit first stage gearset 660 to include a plurality of three (3) first planet gears 676 and second stage gearset 662 to include a plurality of four (4) second planet gears 696 to provide the desired overall speed reduction and torque multiplication while providing a very compact geartrain arrangement. However, dual-stage planetary geartrain 630 can also be configured to use differently sized planet gears and sun gears to establish differing speed ratio reductions between first stage gearset 660 and second stage gearset 662 in conjunction with common ring gear 664. In addition, gearbox unit 604 can also be adapted for use in an offset motor-gearbox assembly (FIG. 6) simply by configuring the arrangement to drive motor output component 620 via transverse gearset (i.e., worm gearset) and electric motor unit. Accordingly, the present disclosure contemplates use of helical gearing in both stages of a dual-stage planetary geartrain; similarly sized pins associated with the planet carriers; use of commonly sized helical planet and sun gears; use of differing materials to meet strength and noise requirements; and provide a modular approach to motor-gearbox assemblies. Finally, it should be understood that a gearbox unit equipped with a dual-stage planetary geartrain can be adapted for use in other types of linear and rotary actuators such as those, for example, used to move a four-bar linkage for powered convertible top systems.

In addition to the above, the following is a summary of some advantageous features associated with the dual-stage planetary geartrain 630. The use of a planetary gearbox having a common ring gear 664 (continuous interior of same diameter and continuous tooth pattern) for use with first and second stage gearsets 660, 662 provides ease of manufacture, reduced noise and improved gear alignment. Additionally, the use of the same size pins 674, 694 in combination with common ring gear 664 allows for common planet gears 676, 696 to be used in both the first and second stage gearsets 660, 662. Different materials can be used for pins 674, 694 to accommodate loading in both the first and second stage gearsets 660, 662 such as, for example, using plastic pins 674 in the first stage gearset 660 and metal pins 694 in second stage gearset 662. Differing types of planet carriers (single carrier plate, dual carrier plates) and/or integration of both planet carriers into a common unit are also possible contemplated alternatives. Additionally, such an integrated carrier unit can be molded together with the planet gears and the pins (for example, compression molding or injection molding of plastics or powdered metals. Other features may include use of plastic planet carriers in combination with metallic pins to reduce overall mass while providing low-friction high-strength axes for the planet gear rotation. Finally, the ability to use differing number of planet gears 676, 696 for first stage gearset 660 and second stage gearset 662 in combination with common ring gear 664 provides enhanced load capabilities, non-equivalent ratio reductions and easier assembly.

In accordance with a preferred configuration, first planet carrier 672 is molded as a one-piece component having first pins 674 extending axially from first planar surface 680 and second sun gear 690 extending axially from a second planar surface 681. The length of first pins 674 may be selected to extend beyond the end of first planet gears 674 with their terminal ends engaging planar surface 684 of cover ring 636 so as to permit elimination of thrust ring 682.

Referring now to FIGS. 27-29, an alternative embodiment of a first planet carrier 750 is shown for use with a dual-stage planetary geartrain 630' in a gearbox unit 604' of motor-gearbox assembly 600. Since many components of gearbox unit 604' are identical or substantially similar in structure and function to previously described components of gearbox unit 604 (FIG. 20), common reference numerals are used hereinafter, with primed reference numerals identifying those components and sub-assemblies that have been slightly modified to integrate first planet carrier 750 therein. In general, first planet carrier 750 is a two-piece assembly having a first or "plate" carrier member 752 and a second or "cover" carrier member 754. In operation, first planet carrier 750 is associated with a first stage gearset 660' and functions to rotatably support a plurality of first planet gears 676 that are each in constant meshed engagement with first sun gear 670 and first ring gear segment 678 of common ring gear 664. First planet carrier 750 is also associated with second stage gearset 662' since second sun gear 756 is integrally formed with and extends axially from a plate segment 758 of plate carrier member 752.

As best seen from FIGS. 28 and 29, plate carrier member 752 is shown to include a plurality of circumferentially-aligned first pins 760 and first mounting lugs 762, each extending axially from plate segment 758. Specifically, the non-limiting embodiment shown includes a plurality of three equally-spaced first pins 760 and a plurality of three equally-spaced mounting lugs 762. Each mounting lug 762 is configured to include an arcuate outer diameter surface 764 that is commonly aligned with an outer peripheral surface 766 of plate segment 758, an inner diameter surface 768 defining a chamber within which first sun gear 670 is rotatably disposed, a planar end surface 770, and a pair of arcuate edge surfaces 772. As seen in FIG. 28, facing edge surfaces 772 of each pair of adjacent mounting lugs 762 define a planet cavity surrounding a corresponding first pin 760 and within which first planet gears 676 rotate. A stepped mounting aperture 776 is formed to extend through each mounting lug 762 and plate segment 758. Each mounting aperture 776 includes a smaller diameter cylindrical segment 776A and a larger diameter cylindrical segment 776B. Mounting apertures 776 may be circumferentially aligned on a common radius with first pins 760. First pins 760 are formed to extend axially from a planar thrust surface 778 of plate segment 758.

Cover carrier member 754 is shown, in this non-limiting configuration, to include a ring segment 780, an annular hub segment 782 extending axially from a first planar surface 784 of ring segment 780, and a plurality of circumferentially-aligned and equally-spaced retention post 786 extending axially from a second planar surface 788 of ring segment 780. Each retention post 786 includes a shaft segment 786A, an enlarged locking segment 786B, and an elongated slot 786C which provides resiliency to posts 786. A plurality of pin retention apertures 790 extend through ring segment 780 and are sized and arranged to accept and retain the terminal end portion of a corresponding one of first pins 760 upon assembly of cover carrier member 754 to plate carrier member 752 following installation of first planet gears 676 on first pins 760.

Upon such assembly, each retention posts 786 is initially installed into a smaller diameter segment 776A of a corresponding one of mounting apertures 776. Slots 786C permit locking segments 786B to resiliently deflect radially inwardly to facilitate movement through smaller diameter segments 776A of mounting apertures 776. Upon positioning of locking segments 786B of retention posts 786 within larger diameter segments 776B of mounting apertures 776, a retention surface 792 is resiliently snapped into engagement with a shoulder surface 794, thereby holding cover carrier member 754 in an installed position relative to plate carrier member 752. As seen best in FIGS. 27 and 29, planar surface 788 of ring segment 780 on cover carrier member 754 engages end surfaces 770 of mounting lugs 762 when two-piece first planet carrier 750 is assembled. Hub segment 782 of cover carrier member 754 is configured to be located in close proximity to cover member 636, while a central aperture 796 formed in cover carrier member 754 aligns with aperture 644 in cover member so as to allow end portion 620 of motor shaft 610 to be drivingly coupled to first sun gear 670. Finally, second sun gear 756 is generally configured to be identical in shape and size to that of second sun gear 690 (FIG. 20). In accordance with a non-limiting preferred construction, plate carrier member 752 and cover carrier member 754 are each molded components manufactured using a plastic material. First planet gears 676 are axially restrained between thrust surface 778 formed on plate segment 758 of plate carrier member 752 and thrust surface 788 formed on ring segment 780 of cover carrier member 754 to accommodate thrust loads associated with the helical gear teeth.

Referring now to FIGS. 30 through 33, an alternative version of two-piece first planet carrier 750 is shown and identified as first planet carrier 750'. Again, common reference numerals are used, with a primed suffix, to identify those components and features of first planet carrier 750' that are generally similar to the previously described components and features of first planet carrier 750. Generally speaking, first planet carrier 750' includes a plate carrier member 752' and a cover carrier member 754'. In this alternative embodiment, first pins 760' now extend from thrust surface 788' of ring segment 780' on cover carrier member 754' and have their terminal end portions retained in retention apertures 790' that are now formed to extend through plate segment 758' of plate carrier member 752'. Retention posts 786' are again provided on ring segment 780' of cover carrier member 754' and are configured for locked retention in retention apertures 776' formed in mounting lugs 762'. Other than these revisions, first planet carrier 750' is substantially similar to first planet carrier 750 and, as such, is adapted for use in gearbox unit 604' as part of dual-stage planetary geartrain 630'.

Referring specifically now to FIG. 34, another two-piece embodiment of a first planet carrier, particularly well-suited to replace first planet carrier 672 in first stage gearset 660 of dual-stage planetary reduction geartrain 630 within gearbox unit 604 of motor-gearbox assembly 600 previously disclosed in reference to FIGS. 15-26, is shown and identified by reference numeral 850. In general, two-piece first planet carrier 850 is constructed to include a second sun gear 852 rigidly secured via an "over-molding" process to a first carrier plate 854. Sun gear 852 is generally similar in size and function to that of sun gear 690 with the exception that sun gear 690 is fabricated as an individual component that is subsequently over-molded during fabrication of first carrier plate 854. First carrier plate 854 includes a plurality of circumferentially-aligned and axially-extending first pins 856 on which first planet gears 676 are rotatably supported. First pins 856 are integrally formed with first carrier plate 854 during the molding process. While not specifically shown, second sun gear 852 includes an axially-extending end portion that is over-molded by a coupling flange segment 858 of first carrier plate 854.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed:

1. An electromechanical strut for moving a pivotal closure member between an open position and a closed position relative to a motor vehicle body, the electromechanical strut comprising:
    a housing connected to one of the closure member and the motor vehicle body;
    an extensible member slideably moveable relative to the housing and connected to the other one of the closure member and the motor vehicle body; and
    a drive mechanism operable for converting rotary motion of a drive member into linear motion of the extensible member for moving the extensible member between a retracted position relative to the housing which corresponds to the closed position of the closure member and an extended position relative to the housing which corresponds to the open position of the closure member, the drive mechanism including a motor-gearbox assembly having an electric motor unit and a gearbox unit, the electric motor unit having a rotary output member, the gearbox unit having a dual-stage planetary geartrain with an input component coupled to the output member of the electric motor unit and an output component coupled to the drive member, wherein the dual-stage planetary geartrain includes a first stage gearset, a second stage gearset and a common helical ring gear having a first ring gear segment and second ring gear segment which together define a continuous helical gear tooth pattern, and wherein said first stage gearset has a first sun gear with helical gear teeth and which is driven by said output member of said electric motor and further including a plurality of first planet gears, said first planet gears having helical gear teeth that are meshed with said first sun gear and said first ring gear segment of said common helical ring gear and a second stage gearset driven by said first gearset and having a second sun gear with helical gear teeth and a plurality of second planet gears, said second planet gears having helical gear teeth that are meshed with said second sun gear and said second ring segment of said common helical ring gear.

2. The electromechanical strut of claim 1 wherein the first stage gearset includes a first planet carrier, and wherein the plurality of first planet gears are rotatably supported on first pins extending from the first planet carrier.

3. The electromechanical strut of claim 2 wherein the second stage gearset second sun gear is driven by the first planet carrier and wherein the second stage gearset includes a second planet carrier, and wherein the plurality of second planet gears are rotatably supported on second pins associated with the second planet carrier.

4. The electromechanical strut of claim 3 wherein the common helical ring gear is formed in a gearbox chamber of a gearbox housing, and wherein the first and second stage gearsets are disposed within the gearbox chamber.

5. The electromechanical strut of claim 4 wherein the gearbox housing includes a cylindrical segment having an inner diameter surface on which the continuous gear tooth pattern of the common helical ring gear is formed, and a cup-shaped end segment defining a tubular boss having an aperture, and wherein the output component of the dual-stage planetary geartrain is fixed for rotation with the second planet carrier and extends through the aperture in the tubular boss.

6. The electromechanical strut of claim 5 wherein the gearbox unit further includes a spacer ring enclosing an open end of the gearbox housing opposite the cup-shaped end segment, and wherein the spacer ring includes an aperture through which the rotary member of the motor unit extends into the gearbox chamber.

7. The electromechanical strut of claim 4 wherein the first planet gears and the second planet gears are circumferentially aligned along a common axis.

8. The electromechanical strut of claim 7 wherein the first planet gears are identical in size and helical gear tooth configuration to the second planet gears.

9. The electromechanical strut of claim 8 wherein the first sun gear is identical in size and helical gear tooth configuration to the second sun gear.

10. The electromechanical strut of claim 9 wherein the same number of the first planet gears and the second planet gears are associated with the dual-stage planetary geartrain.

11. The electromechanical strut of claim 9 wherein a different number of first planet gears and second planet gears are associated with the dual-stage planetary geartrain.

12. The electromechanical strut of claim 11 wherein a plurality of three of the first planet gears and a plurality of four of the second planet gears are associated with the dual-stage planetary geartrain.

13. The electromechanical strut of claim 4 wherein at least one of the first planet carrier and the second planet carrier is made from plastic.

14. The electromechanical strut of claim 13 wherein the first planet carrier is a two-piece assembly having first and second carrier members interconnected and configured to rotatably support the first planet gears therebetween, and wherein the first and second carrier members are made from plastic.

15. The electromechanical strut of claim 4 wherein the gearbox housing is made from plastic.

16. A gearbox unit for interconnecting a rotary output of a motor unit to a rotary drive component, the gearbox unit comprising:
    a gearbox housing defining an internal gearbox chamber and having a stationary common ring gear within the gearbox chamber, the common ring gear having a first ring gear segment and a second ring gear segment which together define a continuous helical gear tooth pattern; and
    a dual-stage planetary geartrain disposed within the gearbox chamber and including a first stage gearset associated with the first ring gear segment and which is driven by the rotary output of the motor unit, the first stage gearset including a first sun pear with helical gear teeth and a plurality of first planet gears with helical gear teeth that are meshed with the first sun gear and the first ring gear segment, and a second stage gearset associated with the second ring gear segment, the second stage gearset including a second sun gear with helical gear teeth and a plurality of second planet pears with helical gear teeth that are meshed with the second sun gear and the second ring gear segment, and wherein the second stage gearset is driven by the first stage gearset for driving the rotary drive component at a reduced speed ratio relative to the rotary output of the motor.

17. The gearbox unit of claim 16 wherein the rotary output of the motor unit extends into the gearbox chamber, and wherein the first stage gearset includes the first sun gear drivingly connected to the rotary output of the motor unit, a first planet carrier, and the plurality of first planet gears rotatably supported by the first planet carrier.

18. The gearbox unit of claim 17 wherein the second stage gearset second sun gear is drivingly connected to the first planet carrier, and wherein the second stage gearset includes a second planet carrier, and the plurality of second planet gears rotatably supported by the second planet carrier.

19. The gearbox unit of claim 18 wherein the first planet gears and the second planet gears are circumferentially aligned along a common rotary axis.

20. The gearbox unit of claim 18 wherein the first planet gears are identical in size and in helical tooth configuration to the second planet gears, and wherein the first and second sun gears are identical in size and in helical tooth configuration.

21. The gearbox unit of claim 16 configured for use in an electromechanical strut for moving a pivotable closure member between an open position and a closed position relative to a motor vehicle body, the electromechanical strut including a housing connected to one of the closure member and the vehicle body and an extensible member slideably moveable relative to the housing and connected to the other of the closure member and the vehicle body, the motor unit and the gearbox unit being mounted in the housing such that the output of the dual-stage planetary geartrain is drivingly connected to a rotary drive component of a drive mechanism configured to move the extensible member between retracted and extended positions relative to the housing which respectively correspond to the closed and open positions of the closure member.

22. An electromechanical strut for moving a pivotal closure member between an open position and a closed position relative to a motor vehicle body, the electromechanical strut comprising:

a housing connected to one of the closure member and the motor vehicle body;

an extensible member slideably moveable relative to the housing and connected to the other one of the closure member and the motor vehicle body; and a drive mechanism operable for converting rotary motion of a drive member into linear motion of the extensible member for moving the extensible member between a retracted position relative to the housing which corresponds to the closed position of the closure member and an extended position relative to the housing which corresponds to the open position of the closure member, the drive mechanism including a motor-gearbox assembly having an electric motor unit and a gearbox unit, the electric motor unit having a rotary output member with a worm fixedly mounted thereon that extends into the gearbox unit, the worm drivingly engaging a worm gear mounted in the gearbox unit, the worm gear including a journaled shaft extending transverse to the worm gear along its rotational axis and having a pinion gear that drivingly engages a drive gear, the extensible member being connected to a central aperture in the drive gear wherein rotation of the drive gear moves the extensible member relative to the housing.

\* \* \* \* \*